United States Patent
Tabata et al.

(10) Patent No.: US 6,174,263 B1
(45) Date of Patent: Jan. 16, 2001

(54) AUTOMOTIVE VEHICLE CONTROL APPARATUS INCLUDING MEANS FOR PREVENTING BETWEEN RUNNING STABILITY CONTROL MEANS AND CONTROLS OF DEVICES IN POWER TRANSMITTING SYSTEM

(75) Inventors: Atsushi Tabata, Okazaki; Hideki Miyata; Masato Kaigawa, both of Toyota, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/535,993

(22) Filed: Mar. 27, 2000

Related U.S. Application Data

(62) Division of application No. 08/897,711, filed on Jul. 18, 1997.

(30) Foreign Application Priority Data

Jul. 18, 1996 (JP) .................................................. 8-189735

(51) Int. Cl.[7] ...................................................... F16H 61/02
(52) U.S. Cl. .............................................. 477/97; 180/197
(58) Field of Search ......................... 477/96, 97; 180/197

(56) References Cited

U.S. PATENT DOCUMENTS

| | | | | |
|---|---|---|---|---|
| 5,107,948 | * | 4/1992 | Yamamoto | 180/197 |
| 5,113,718 | | 5/1992 | Sato . | |
| 5,117,934 | * | 6/1992 | Tsuyama et al. | 180/197 |
| 5,191,953 | * | 3/1993 | Ito et al. | 180/197 |
| 5,197,008 | * | 3/1993 | Itoh et al. | 180/197 |
| 5,225,982 | * | 7/1993 | Ito et al. | 180/197 X |
| 5,265,693 | * | 11/1993 | Rees et al. | 180/197 X |
| 5,732,371 | * | 3/1998 | Fujita et al. | 701/38 |
| 5,873,802 | * | 2/1999 | Tabata et al. | 477/96 |
| 5,921,889 | * | 7/1999 | Nozaki et al. | 477/97 X |
| 5,947,856 | | 9/1999 | Tabata et al. | 477/128 |
| 6,059,688 | * | 5/2000 | Nozaki et al. | 477/97 |
| 6,070,118 | * | 5/2000 | Ohta et al. | 477/97 |
| 6,077,190 | * | 6/2000 | Tabata et al. | 477/97 |

FOREIGN PATENT DOCUMENTS

| | | |
|---|---|---|
| 61-88058 | 5/1986 | (JP) . |
| 63-270962 | 11/1988 | (JP) . |
| 1-261547 | 10/1989 | (JP) . |
| 3-117773 | 5/1991 | (JP) . |
| 4-165160 | 6/1992 | (JP) . |
| 4-191562 | 7/1992 | (JP) . |
| 4-266538 | 9/1992 | (JP) . |
| 5-71626 | 3/1993 | (JP) . |
| 8-142715 | 6/1996 | (JP) . |

OTHER PUBLICATIONS

SAE Technical Series 940832, "Consideration of Lateral and Longitudinal Vehicle Stability by Function Enhanced Brake and Stability Control System", Neinz Leffler, BMW AG, Feb. 1994.*

* cited by examiner

Primary Examiner—Khoi Q. Ta
(74) Attorney, Agent, or Firm—Oblon, Spivak, McClelland, Maier & Neustadt, P.C.

(57) ABSTRACT

Vehicle control apparatus including a running stability controller for performing a predetermined operation for improving stability of running of the vehicle by reducing engine output, braking the vehicle, holding automatic transmission in a predetermined position or shifting up the transmission, for example, and a device for preventing an interference between the operation of the running stability controller and an operation of a device, such as the automatic transmission, a torque converter lock-up clutch and a differential limiting clutch, which device is provided in a power transmitting system and which is controlled by an appropriate controller.

3 Claims, 22 Drawing Sheets

FIG. 2

|  | C0 | C1 | C2 | B0 | B1 | B2 | B3 | B4 | F0 | F1 | F2 |
|---|---|---|---|---|---|---|---|---|---|---|---|
| N |  |  |  | ◌ |  |  |  |  |  |  |  |
| Rev |  |  | ○ | ○ |  |  |  | ○ |  |  |  |
| 1st | ○ | ○ |  |  |  |  |  | ● | ○ |  | ○ |
| 2nd | ● | ○ |  |  |  |  | ○ |  | ○ |  |  |
| 3rd | ○ | ○ |  |  | ● | ○ |  |  | ○ | ○ |  |
| 4th | ○ | ○ | ○ |  |  | △ |  |  | ○ |  |  |
| 5th |  | ○ | ○ | ○ |  | △ |  |  |  |  |  |

FIG. 10
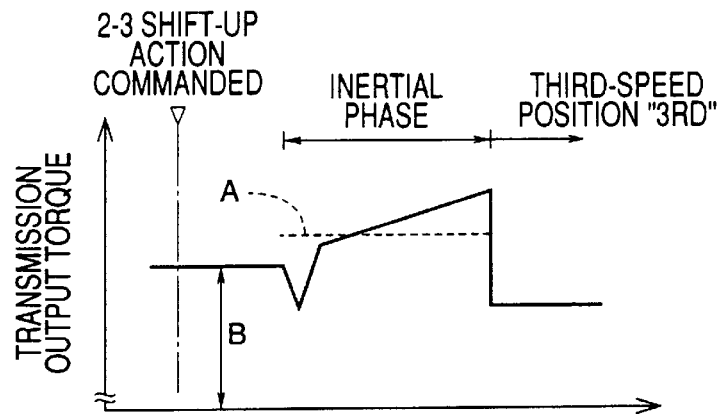
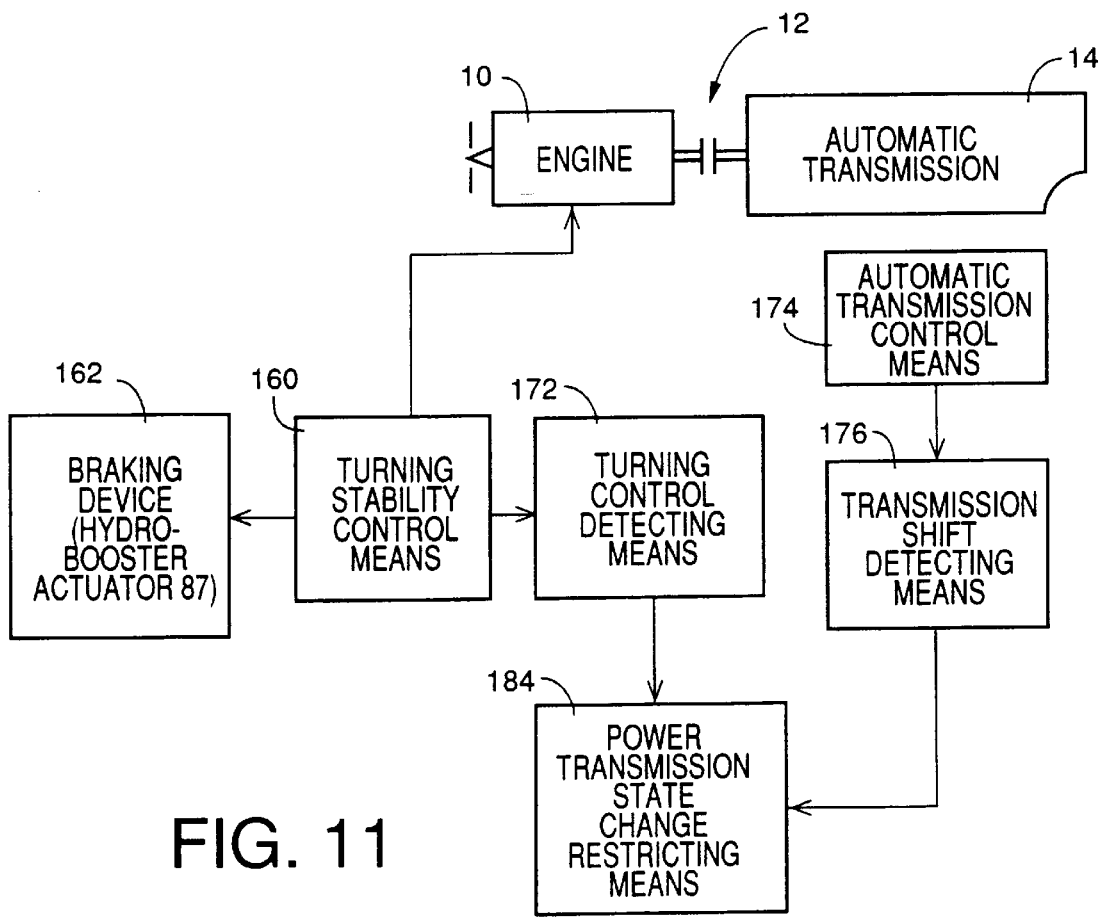
FIG. 11

AUTOMOTIVE VEHICLE CONTROL APPARATUS INCLUDING MEANS FOR PREVENTING BETWEEN RUNNING STABILITY CONTROL MEANS AND CONTROLS OF DEVICES IN POWER TRANSMITTING SYSTEM

This application is a Division of application Ser. No. 08/897,711 Filed on Jul. 18, 1997.

This application is based on Japanese Patent Application NO. 8-189735 filed Jul. 18, 1996, the content of which is incorporated hereinto by reference.

BACKGROUND OF THE INVENTION

1. Field of the Invention

The present invention relates to an apparatus for controlling an automotive vehicle, more specifically, an engine, an automatic transmission and other devices of the vehicle. More particularly, the present invention is concerned with means for preventing an interference between running stability control means and controls of various devices in power transmitting system of the vehicle.

2. Discussion of the Prior Art

An automotive vehicle may fall in an unstable running condition with the lateral road gripping capacity of a wheel tire being exceeded during turning of the vehicle on a road surface having a relatively low friction coefficient, or at a relatively high speed, or to clear an obstacle, for example. The unstable running condition may be an oversteering or understeering tendency of the vehicle. The oversteering tendency is caused when the road gripping force of the rear wheels is considerably smaller than that of the front wheels, resulting in an excessively larger turning angle of the vehicle than the steering angle, and leading to a spinning tendency of the vehicle. On the other hand, the understeering tendency is caused when the road gripping force of the front wheels is considerably smaller than that of the rear wheels, resulting a considerably smaller turning angle of the vehicle than the steering angle.

To cope with such running instability of the vehicle, there has been proposed a turning stability control apparatus for stabilizing the vehicle turning behavior, for instance, a vehicle stability control system (VSC system) as disclosed in JP-A-4-266538. Such a turning stability control apparatus is activated when the vehicle turning condition is unstable, namely, when an oversteering or understeering tendency of the vehicle is detected. Described in detail, the apparatus is adapted to reduce the engine output and at the same time apply a braking force to the front or rear wheels, for producing a moment to reduce the oversteering or understeering tendency of the vehicle, thereby to stabilize the turning behavior attitude of the vehicle.

In the automotive vehicle equipped with such a turning stability control apparatus, there are encountered various sorts of drawbacks due to interferences or inadequate coordination between an operation of the turning stability control apparatus, and control operations of various devices of the power transmitting system, such as: a fluid-operated power transmitting device (e.g., torque converter) incorporating a direct-coupling clutch (e.g., lock-up clutch); an automatic transmission; and a differential limiting clutch.

For instance, the following drawbacks are conventionally encountered:

(1) Where the turning stability control apparatus is adapted to control a throttle valve of the engine or a braking device for improving the turning stability of the vehicle, and a controller for the power transmitting system is adapted to effect a learning control of the system, an operation of the turning stability control apparatus may cause the learning control to be effected erroneously, and the erroneous learning control of the power transmitting system leads to an unstable operation of the system, which may cause a shock to be generated in the power transmission path.

(2) Where the turning stability control apparatus is adapted to control the engine output torque thereby to control the vehicle drive force, the vehicle drive force cannot be controlled with sufficiently high accuracy by the engine output control by the turning stability control device, when the automatic transmission is in the process of a shifting action, or when the control mode of the lock-up clutch is changed, since an inertia torque is generated during the shifting action of the automatic transmission, and the torque ratio of the torque converter varies due to a change in the control mode of the lock-up clutch.

(3) Where a controller for the automatic transmission is adapted to inhibit a shifting action of the automatic transmission (hold it in the same operating position) during turning of the vehicle or during running of the vehicle on an uphill or downhill road, while the turning stability control apparatus is adapted to reduce the throttle valve opening or shift up the automatic transmission as well as reduce the throttle valve opening, the operation of the turning stability control apparatus may interfere with the operation of the automatic transmission controller, that is, the turning stability control apparatus may command the automatic transmission to be shifted up while the automatic transmission controller commands the automatic transmission to be held in the same operating position.

(4) Where the turning stability control apparatus is operated, upon generation of the excessive understeering tendency, to reduce the throttle valve opening to reduce the engine output and at the same time apply a brake to the front wheel on the outer side of the vehicle turning path, the power transmitting system may suffer from a shock due to a change in the engine speed caused by the reduction of the throttle valve opening and the brake application to the front wheel.

(5) Where the turning stability control apparatus is adapted to hold the automatic transmission in a predetermined operating position or shift up the automatic transmission and change the throttle valve opening by an amount corresponding to an expected amount of reduction of the vehicle drive force caused by the holding or shift-up action of the automatic transmission, the vehicle drive force may become inadequate to improve the vehicle turning stability in the event where the automatic transmission cannot be shifted to the predetermined position or cannot be shifted up, for some reason or other.

(6) Where the turning stability control apparatus is adapted to hold the automatic transmission in the predetermined position and inhibit a shifting action thereof, the automatic transmission may be shifted down or up immediately after the inhibition of the shifting action is cancelled. In this case, the shift-down action of the automatic transmission may cause a shifting shock under some running condition of the vehicle, or the shift-up action may cause a decrease in the vehicle drive force unexpectedly to the vehicle operator under some vehicle running condition.

SUMMARY OF THE INVENTION

It is therefore an object of this invention to provide an apparatus for controlling an automotive vehicle, which apparatus ameliorates the conventionally encountered drawbacks due to interferences or inadequate coordination between the operation of the running stability control apparatus, and the control operations of various devices of the power transmitting system, such as a fluid-operated power transmitting device with a direct-coupling clutch, an automatic transmission, and a differential limiting clutch.

The above object may be achieved according to a first aspect of this invention, which provides an apparatus for controlling an automotive vehicle having an engine and a power transmitting system operatively connected to said engine, the apparatus comprising: (a) running stability control means operated upon reduction of stability of running of the vehicle below a predetermined threshold, for controlling at least one of a braking force applied to the vehicle and an output of the engine; (b) learning compensation means for effecting learning compensation of at least one parameter associated with at least one hydraulically operated frictional coupling device provided in the power transmitting system; (c) running control detecting means for detecting an operation of the running stability control means; and (d) learning compensation inhibiting means for inhibiting an operation of the learning compensation means if the operation of the running stability control means is detected by the running control detecting means.

In the present vehicle control apparatus according the first aspect of this invention, the operation of the learning compensation means is inhibited by the learning compensation inhibiting means when the running control detecting means detects the operation of the running stability control means. Therefore, the parameter or parameters associated with the power transmitting system is/are not erroneously compensated by the learning compensation means as long as the running stability control means is operating for controlling the braking force and/or the engine output for the purpose of improving the stability of running of the vehicle, in particular, turning of the vehicle. Thus, the present vehicle control apparatus is effective to prevent control instability or shifting shock of the power transmitting system due to erroneous compensation of the parameter or parameters of the power transmitting system. In other words, the present vehicle control apparatus does not suffer from drawbacks conventionally experienced due to interference or inadequate coordination between the operation of the running stability control means and the controls of the devices or components of the power transmitting system such as a fluid-operated power transmitting device with a direct coupling clutch, an automatic transmission and a differential limiting clutch.

In a first preferred form of the first aspect of this invention, the power transmitting system includes an automatic transmission, and the learning compensation means includes shift pressure learning control means for effecting learning compensation of a hydraulic pressure of a hydraulically operated frictional coupling device which is operated to achieve a shifting action of the automatic transmission. In this case, the shift pressure learning control means is adapted to adjust the hydraulic pressure so as to achieve the shifting action in an intended manner.

In one advantageous arrangement of the above first preferred form of the apparatus, the shifting action of the automatic transmission is achieved by a releasing action of a first hydraulically operated frictional coupling device, and an engaging action of a second hydraulically operated frictional coupling device which takes place simultaneously with the releasing action. In this case, the shift pressure leaning control means is adapted to effect the learning compensation of the hydraulic pressure of at least one of the first and second hydraulically operated frictional coupling devices such that an amount of overshoot of the engine which is a temporary rise of a speed of the engine or an amount of tie-up of the automatic transmission which is a temporary drop of an output shaft speed of the automatic transmission is held within a predetermined optimum range.

In the above arrangement, the power transmitting system may include a pressure control valve for directly controlling the hydraulic pressure of each of the above-indicated at least one of the first and second hydraulically operated frictional coupling devices, which hydraulic pressure is compensated by the shift pressure learning control means.

In a second preferred form of the first aspect of this invention, the power transmitting system includes an automatic transmission, and a fluid-operated power transmitting device which is disposed between the engine and the automatic transmission and which has an input rotary member, an output rotary member, and a lock-up clutch for direct connection of the input and output rotary members. In this instance, the learning compensation means includes lock-up clutch slip learning control means for effecting learning compensation of a hydraulic pressure of the lock-up clutch, for example, in a slip control mode in which the hydraulic pressure of the lock-up clutch is controlled such that an actual amount of slip of the lock-up clutch coincides with a predetermined target value.

In a third preferred form of the first aspect of the invention, the power transmitting system includes a transfer device, a center differential gear device, and a differential limiting clutch which is disposed in one of the transfer device and the center differential gear device, for controlling a ratio of distribution of a drive force to front and rear wheels of the automotive vehicle. In this instance, the learning compensation means includes differential limiting clutch compensating means for effecting learning compensation of a hydraulic pressure of the differential limiting clutch, which determines the squeezing force of the differential limiting clutch.

The object indicated above may also be achieved according to a second aspect of the present invention, which provides an apparatus for controlling an automotive vehicle having an engine and an automatic transmission, the apparatus comprising: (a) drive force calculating means for calculating a drive force currently acting on the vehicle, on the basis of an output torque of the engine, and according to a predetermined relationship between the drive force and the output torque; (b) running stability control means operated upon reduction of stability of running of the vehicle below a predetermined threshold, for performing a predetermined operation for improving the stability of running of the vehicle; (c) transmission shift detecting means for detecting a shifting action of the automatic transmission; and (d) drive force compensating means, operated when the shifting action of the automatic transmission is detected by the transmission shift detecting means, for compensating the drive force as calculated by the drive force calculating means, depending upon an influence of the shifting action on an actual value of the drive force acting on the vehicle.

In the vehicle control apparatus according to the present second aspect of this invention, the drive force compensating means is operated when a shifting action of the automatic transmission is detected by the transmission shift detecting means, to compensate the drive force as calculated by the drive force calculating means, depending upon the inertia torque in the shifting action of the automatic transmission, which has an influence on the actual drive force acting on the vehicle drive wheels. This arrangement is effective to assure a sufficiently high degree of accuracy of control of the vehicle drive force by the running stability control means on the basis of the engine output torque, for example, even when the drive force control is effected during the shifting action of the automatic transmission, that is, even when the automatic transmission is in the inertia phase of the shifting action in which the vehicle drive force varies due to the inertia torque. Therefore, the present vehicle control apparatus does not suffer from drawbacks conventionally experienced due to interference or inadequate coordination between the operation of the running stability control means and the control of the automatic transmission.

In one preferred form of the apparatus according to the second aspect of this invention, the drive force calculating means is adapted to dalculate the drive force on the basis of the output torque of the engine, a torque ratio of a torque converter and a speed ratio of the automatic transmission, and according to a predetermined relationship between the drive force, and the output torque of the engine the torque ratio of the torque converter and the speed ratio of the automatic transmission.

In one advantageous arrangement of the above preferred form of the apparatus, the drive force compensating means calculates a compensated drive force value by adding an inertia torque generated in the shifting action of the automatic transmission, to the drive force which is calculated by the drive force calculating means according to the predetermined relationship on the basis of the output torque of the engine, the torque ratio of the torque converter and the speed ratio of the automatic transmission.

In another preferred form of the apparatus according to the second aspect of the invention, the drive force compensating means uses a predetermined value as the drive force during the shifting action of the automatic transmission, in place of the drive force calculated by the drive force calculating means. In this case, the drive force compensating means may be adapted to determine the above-indicated predetermined value on the basis of the drive force calculated by the drive force calculating means immediately before the shifting action is initiated.

The object indicated above may also be achieved according to a third aspect of the present invention, which provides an apparatus for controlling an automotive vehicle having an engine, and a power transmitting system including an automatic transmission, the apparatus comprising: (a) drive force calculating means for calculating a drive force currently acting on the vehicle, on the basis of an output torque of the engine, and according to a predetermined relationship between the drive force and the output torque; (b) running stability control means operated upon reduction of stability of running of the vehicle below a predetermined threshold, for performing a predetermined operation for improving the stability of running of the vehicle; (c) running control detecting means for detecting the predetermined operation of the running stability control means; and (d) power transmission state change restricting means, operated when the predetermined operation of the running stability control means is detected by the running control detecting means, for restricting a change of a power transmission state of the power transmitting system.

In the vehicle control apparatus according to the third aspect of this invention, the power transmission state change restricting means is operated to restrict a change in the power transmission state of the power transmitting system when an operation of the running stability control means is detected by the running control detecting means. This arrangement is effective to assure a sufficiently high accuracy of control of the vehicle drive force by the running stability control means on the basis of the engine output torque, for example, even when the torque ratio of the torque converter is changed in relation to the operating state of the lock-up clutch. Therefore, the present vehicle control apparatus does not suffer from drawbacks conventionally experienced due to interference or inadequate coordination between the operation of the running stability control means and the control of the lock-up clutch.

In one preferred form of this third aspect of the invention, the power transmitting system includes a torque converter, and the drive force calculating means is adapted to calculate the drive force on the basis of the output torque of the engine, a torque ratio of the torque converter and a speed ratio of the automatic transmission, and according to a predetermined rationship between the drive force, and the output torque of the engine, the torque ratio of the torque converter and the speed ratio of the automatic transmission.

In another preferred form of the third aspect of the invention, the power transmission state change restricting means is adapted to inhibit a shifting operation of the automatic transmission to thereby restrict the change of the power transmission state of the power transmitting system while the running stability control means is operated.

In a further preferred form the apparatus, the torque converter includes a lock-up clutch, and the power transmission state change restricting means is adapted to inhibit a change between a fully engaged mode and a fully released mode of the lock-up clutch, to thereby restrict the change of the power transmission state of the power transmitting system while the running stability control means is operated. Alternatively, the power transmission state change restricting means is adapted to fully release the lock-up clutch and thereby inhibit a change in an amount of slip thereof, to thereby restrict the change of the power transmission state of the power transmitting system while the running stability control means is operated.

The object indicated above may also be achieved according to a fourth aspect of this invention, which provides an apparatus for controlling an automotive vehicle having an automatic transmission, the apparatus comprising: (a) automatic transmission control means for shifting the automatic transmission according to a normal shifting pattern, transmission control overriding means for overriding the automatic transmission control means while the vehicle is running in a predetermined condition; (b) running stability control means operated upon reduction of stability of running of the vehicle below a predetermined threshold, for performing a predetermined operation for improving the stability of running of the vehicle; (c) override detecting means for detecting an operation of the transmission control overriding means; and (d) running stability control preference means, operated when the operation of the transmission control overriding means is detected by the override detecting means, for disabling the transmission control overriding means and commanding the running stability control means to be operated for improving the stability of running of the vehicle.

In the vehicle control apparatus according to the fourth aspect of this invention, the running stability control preference means is operated to disable the transmission control overriding means and permit the operation of the running stability control means to be continued, when the operation of the transmission control overriding means is detected by the override detecting means during the vehicle running in the predetermined condition, for instance, during the vehicle running or turning with the steering angle exceeding a predetermined upper limit, and/or during the vehicle running on an uphill or a downhill road surface whose gradient is outside a predetermined range. This arrangement is effective to prevent an interference between the operation of the running stability control means to reduce the throttle opening angle (engine output) and/or shift-up the automatic transmission 14, and the operation of the transmission control overriding means which is adapted to override the automatic transmission control means during the vehicle running in the predetermined condition.

In one preferred form of the apparatus according to the fourth aspect of the invention, the transmission control overriding means holds the automatic transmission in a currently established position thereof while the vehicle is turning with a steering angle exceeding a predetermined upper limit, and/or while the vehicle is running on a road surface whose gradient is outside a predetermined range.

In another preferred form of the fourth aspect of the invention, the vehicle control apparatus further comprises: override stability determining means, operated upon termination of the operation of the running stability control means initiated by the running stability control preference means, for determining whether an operation of the transmission control overriding means can be resumed with stability without a shifting shock of the automatic transmission; and override enabling means for enabling the transmission control overriding means to operate for controlling the automatic transmission, when the override stability determining means determines that the operation of the transmission control overriding means can be resumed with stability.

The object indicated above may be achieved according to a fifth aspect of this invention, which provides an apparatus for controlling an automotive vehicle having an engine, an automatic transmission and a fluid-operated power transmitting device including an input rotary member operatively connected to the engine, an output rotary member operatively connected to the automatic transmission, and a lock-up clutch which is engaged for direct connection of the input and output rotary members, the apparatus comprising: (a) running stability control means operated upon reduction of stability of running of the vehicle below a predetermined threshold, for performing a predetermined operation for improving the stability of running of the vehicle; (b) running control initiation detecting means for detecting an initiation of the predetermined operation of the running stability control means; and (c) lock-up clutch releasing means operated when the initiation of the operation of the running stability control means is detected by the running control initiation detecting means, for releasing the lock-up clutch.

In one preferred form of the apparatus according to the fifth aspect of the present invention, the lock-up clutch releasing means is adapted to release the lock-up clutch before an output of the engine is controlled by the running stability control means for improving the stability of running or turning of the vehicle.

In another preferred form of the fifth aspect of the invention, the lock-up clutch releasing means is adapted to release the lock-up clutch before a brake is applied to the vehicle by the running stability control means for improving the stability of running or turning of the vehicle.

In a further preferred form of the fifth aspect of the invention, the lock-up clutch releasing means is adapted to hold the lock-up clutch released while the running stability control means is operating for improving the stability of running or turning of the vehicle.

In the vehicle control apparatus according to the present fifth aspect of the invention, the lock-up clutch is released by the lock-up clutch releasing means when the initiation of an operation of the running stability control means is detected by the running control initiation detecting means. This arrangement is effective to prevent generation of a shock even when the engine speed is rapidly lowered by the running stability control means, which is operated as a result of occurrence of an excessive understeering tendency of the vehicle, so as to reduce the throttle opening angle and apply a brake to one of the front wheels which is on the outer side of the turning path of the vehicle.

The object indicated above may also be achieved according to a sixth aspect of this invention, which provides an apparatus for controlling an automotive vehicle having an automatic transmission, comprising: (a) running stability control means operated upon reduction of stability of running of the vehicle below a predetermined threshold, for performing a predetermined operation for improving the stability of running of the vehicle; (b) transmission control feasibility determining means for determining whether it is impossible to hold said automatic transmission in a predetermined position or shift up said automatic transmission, while said running stability control means is required to hold said automatic transmission in said predetermined position or shift up said automatic transmission; (c) running control overriding means operated when said transmission control feasibility determining means determines that it is impossible to hold said automatic transmission in said predetermined position or shift up said automatic transmission, for overriding said running stability control means.

In the present vehicle control apparatus, the throttle opening angle of the engine is controlled by an amount corresponding to an expected amount of reduction of the vehicle drive force caused by the operation of the running stability control means to hold the automatic transmission in the predetermined position or shift up the automatic transmission. If the transmission control feasibility determining means determines that it is impossible to hold the automatic transmission in the predetermined position or effect the predetermined shift-up action of the automatic transmission, the running control overriding means overrides the running stability control means, so as to inhibit the required operation of the running stability control means or change this operation to another. This arrangement assures running stability, particularly, turning stability of the vehicle even in the case where the automatic transmission cannot be shifted to the predetermined position or shifted up to reduce the vehicle drive force, due to some defect of any valve associated with the shifting of the automatic transmission, or due to inhibition of a shifting action of the automatic transmission for some reason or other.

In one preferred form of the sixth aspect of this invention, the running control overriding means inhibits the operation of the running stability control means to hold the automatic transmission in the predetermined position or shift up the automatic transmission.

In another preferred form of the sixth aspect of the invention, the running control overriding means not only inhibits the operation of the running stability control means to hold the automatic transmission in the predetermined position or shift up the automatic transmission, but also reduces an output or throttle opening angle of an engine of the vehicle to reduce the drive force for driving the vehicle.

In a further preferred form of the apparatus of the sixth aspect of the invention, the automatic transmission includes hydraulically operated frictional coupling devices, and is provided with a hydraulic control circuit including shift valves and solenoid-operated valves for controlling the frictional coupling devices. In this instance, the transmission control feasibility determining means is adapted to determine whether it is impossible to hold the automatic transmission in the predetermined position or shift up the automatic transmission, by determining whether any one of the shift valves and the solenoid-operated valves is defective.

In a still further preferred form of the apparatus of the sixth aspect of the invention, the transmission control feasibility determining means determining whether it is impossible to hold the automatic transmission in the predetermined position or shift up the automatic transmission, by determining whether a shifting to the predetermined position or a shift-up action of the automatic transmission is inhibited.

The object indicated above may also be achieved according to a seventh aspect of this invention, which provides an apparatus for controlling an automotive vehicle having an automatic transmission, comprising: (a) running stability control means operated upon reduction of stability of running of the vehicle below a predetermined threshold, for holding the automatic transmission in a predetermined position and performing a predetermined operation for improving the stability of running of the vehicle; (b) transmission hold release determining means for determining whether the vehicle is running in a predetermined condition in which a shifting action of said automatic transmission from said predetermined position will not cause a shifting shock after holding of the automatic transmission in said predetermined condition is released; and (d) transmission hold releasing means, operated when said transmission hold release determining means determines that the vehicle is running in said predetermined condition, for releasing holding of said automatic transmission in said predetermined position.

In the present vehicle control apparatus according to the seventh aspect of this invention, the holding of the automatic transmission in the predetermined position is released by the transmission hold releasing means when the transmission hold release determining means determines that the vehicle is running in the predetermined condition in which a shifting action of the automatic transmission from the predetermined position does not cause a shifting shock. This arrangement is effective to prevent a shifting shock of the automatic transmission or a decrease of the vehicle drive force when the automatic transmission is shifted up or down immediately after the holding is released or cancelled.

In one preferred form of the seventh aspect of this invention, the transmission hold release determining means determines that the vehicle is running in the predetermined condition, when the predetermined position in which the automatic transmission is held by the running stability control means upon reduction of the stability of running of the vehicle below the predetermined threshold is the same as a position which is to be selected on the basis of a running speed of the vehicle and an opening angle of a throttle valve of an engine and according to a predetermined shift pattern.

In another preferred form of the seventh aspect of the invention, the transmission hold release determining means determines whether the vehicle is running in an engine-braking condition in which a drive force is transmitted in a direction from drive wheels of the vehicle toward an engine, and the transmission hold releasing means releases the holding of the automatic transmission in the predetermined position and permits the automatic transmission to be shifted up from the predetermined position.

In a further preferred form of the seventh aspect of the invention, the transmission hold release determining means determines whether the vehicle is running in an accelerator-on state in which a drive force is transmitted in a direction from an engine toward drive wheels of the vehicle, and the releasing means releases the holding of the automatic transmission in the predetermined position and permits the automatic transmission to be shifted down from the predetermined position. In this case, however, it is desirable that the maximum number of shift-down positions be determined so as to prevent an unexpected feel upon subsequent further depression of the accelerator pedal by the vehicle operator.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 2 is a view indicating a relationship between combinations of operating states of frictional coupling devices of the automatic transmission and respective operating positions of the automatic transmission;

FIG. 10 is a time chart for explaining an output torque of the automatic transmission during a 2–3 shift-up action thereof in the embodiment of FIG. 8;

FIG. 11 is a block diagram corresponding to that of FIG. 6, illustrating various functional means of a vehicle control apparatus according to a third embodiment of the invention;

DETAILED DESCRIPTION OF THE PREFERRED EMBODIMENTS

Figure 1:
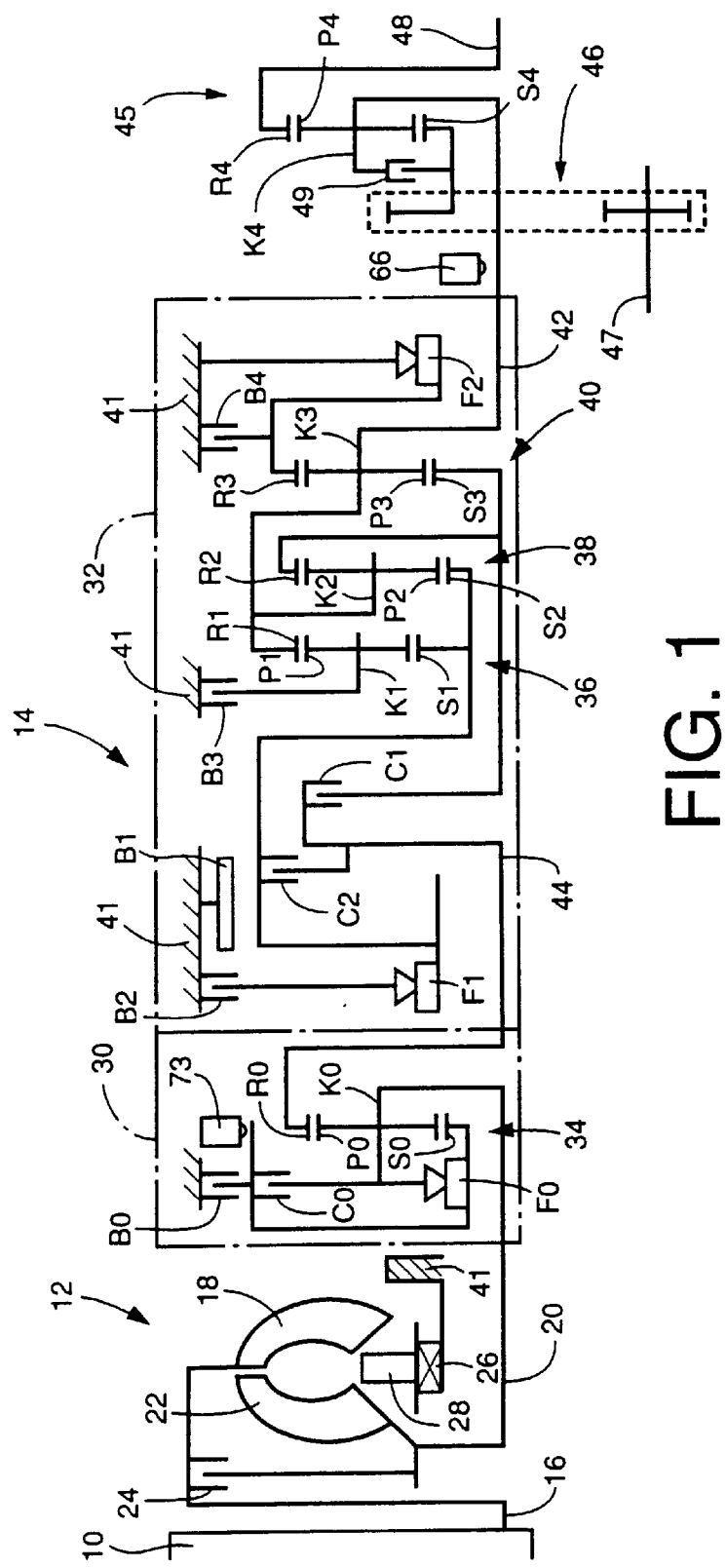
FIG. 1 is a schematic view of a power transmitting system of an automotive vehicle including an automatic transmission controlled by a transmission controller which is a part of a vehicle control apparatus constructed according to one embodiment of this invention.

Referring first to the schematic view of FIG. 1, the power transmitting system shown therein including an automatic transmission 14 controlled by a transmission controller 78 (described below) which is a part of a vehicle control apparatus constructed according to one embodiment of this invention. The power transmitting system further includes an engine 10, and a torque converter 12 through which the output of the engine 10 is transmitted to the automatic transmission. The output of the automatic transmission 14 is transferred to drive wheels of the vehicle through differential gear devices and drive shafts, as described below.

The torque converter 12 includes a pump impeller 18 connected to a crankshaft 16 of the engine 10, a turbine impeller 22 connected to an input shaft 20 of the automatic transmission 14, a lock-up clutch 24 which is engaged for direct connection of the pump and turbine impellers 18, 22, and a stator 28 which is prevented by a one-way clutch 26 from rotating in one direction. The lock-up clutch 24 is one of hydraulically operated frictional coupling devices provided in the power transmitting system.

The automatic transmission 14 includes a first transmission unit 30 having a high-gear position and low-gear position, and a second transmission unit 32 having a rear-drive position and four forward-drive positions. The first transmission unit 30 includes a High-Low planetary gear set 34 having a sun gear S0, a ring gear R0, a carrier K0, and a planetary gear P0 which is rotatably supported by the carrier K0 and which meshes with the sun gear S0 and the ring gear R0. The first transmission unit 30 further includes a clutch C0 and a one-way clutch F0 which are disposed between the sun gear S0 and the carrier K0, and a brake B0 disposed between the sun gear S0 and a housing 41 of the automatic transmission 14.

The second transmission unit 32 includes a first planetary gear set 36, a second planetary gear set 38 and a third planetary gear set 40. The first planetary gear set 36 has a sun gear S1, a ring gear R1, a carrier K1, and a planetary gear P1 which is rotatably supported by the carrier K1 and which meshes with the sun gear S1 and the ring gear R1. The second planetary gear set 38 has a sun gear S2, a ring gear R2, a carrier K2, and a planetary gear P2 which is rotatably supported by the carrier K2 and which meshes with the sun gear S2 and the ring gear R2. The third planetary gear set 40 has a sun gear S3, a ring gear R3, a carrier K3, and a planetary gear P3 which is rotatably supported by the carrier K3 and which meshes with the sun gear S3 and the ring gear R3.

The sun gears S1, S2 are formed integrally with each other, and the ring gear R1 and the carriers K2, K3 are formed integrally with each other. The carrier K3 is connected to an output shaft 42 of the automatic transmission 14. The ring gear R2 is integrally connected to the sun gear S3. A clutch C1 is disposed between an intermediate shaft 44 and the ring and sun gears R2, S3, while a clutch C2 is disposed between the intermediate shaft 44 and the sun gears S1, S2. A band brake B1 for inhibiting rotation of the sun gears S1, S2 is disposed on the housing 41. A series connection of a one-way clutch F1 and a brake B2 is disposed between the housing 41 and the sun gears S1, S2. This one-way clutch F1 is adapted to be engaged when a torque acts on the sun gears S1, S2 in the direction opposite to the direction of rotation of the input shaft 20.

A brake B3 is disposed between the carrier K1 and the housing 41, while a parallel connection of a brake B4 and a one-way clutch F2 is disposed between the ring gear R3 and the housing 41. This one-way clutch F2 is adapted to be engaged when a torque acts on the ring gear R3 in the reverse direction.

The power transmitting system further includes a center differential gear device 45, which includes: a a pinion P4; a carrier K4 which rotatably supports the pinion P4 and which is connected to the output shaft 42; a sun gear S4 connected to a front drive shaft 47 through a transfer device 46; a ring gear R4 connected to a rear-drive shaft 48; and a differential limiting clutch 49 disposed between the carrier K4 and the sun gear S4. The differential limiting clutch 49 is also a hydraulically operated frictional coupling device. A drive force delivered from the automatic transmission 14 is distributed by the center differential gear device 45 to the front-drive and rear-drive shafts 47, 48. The drive forces received by the front-drive and rear-drive shafts 47, 48 are transferred to a pair of front wheels and a pair of rear wheels, respectively, through respective differential gear devices.

The automatic transmission 14 constructed as described above has one rear-drive position "Rev", and five forward-drive positions, namely, a first-speed position "1st", a second-speed position "2nd", a third-speed position "3rd", a fourth-speed position "4th" and a fifth-speed position "5th", which have different speed ratios. These operating positions of the automatic transmission 14 are selectively established by respective combinations of the operating states of hydraulically operated frictional coupling devices, that is, clutches C0–C2, brakes B0–B4 and one-way clutches F0, F1, F2, as indicated in the table of FIG. 2. In this table, white circles represent the engaged states of the frictional coupling devices, while blanks represent the released states of the frictional coupling devices. Black circles represent the engaged states when an engine brake is applied to the vehicle, namely, when a torque is transmitted in the direction from the vehicle wheels to the engine 10. It will be understood from the table that the brake B3 is engaged when the automatic transmission 14 is shifted up from the first-speed position "1st" to the second-speed position "2nd".

Figure 3:
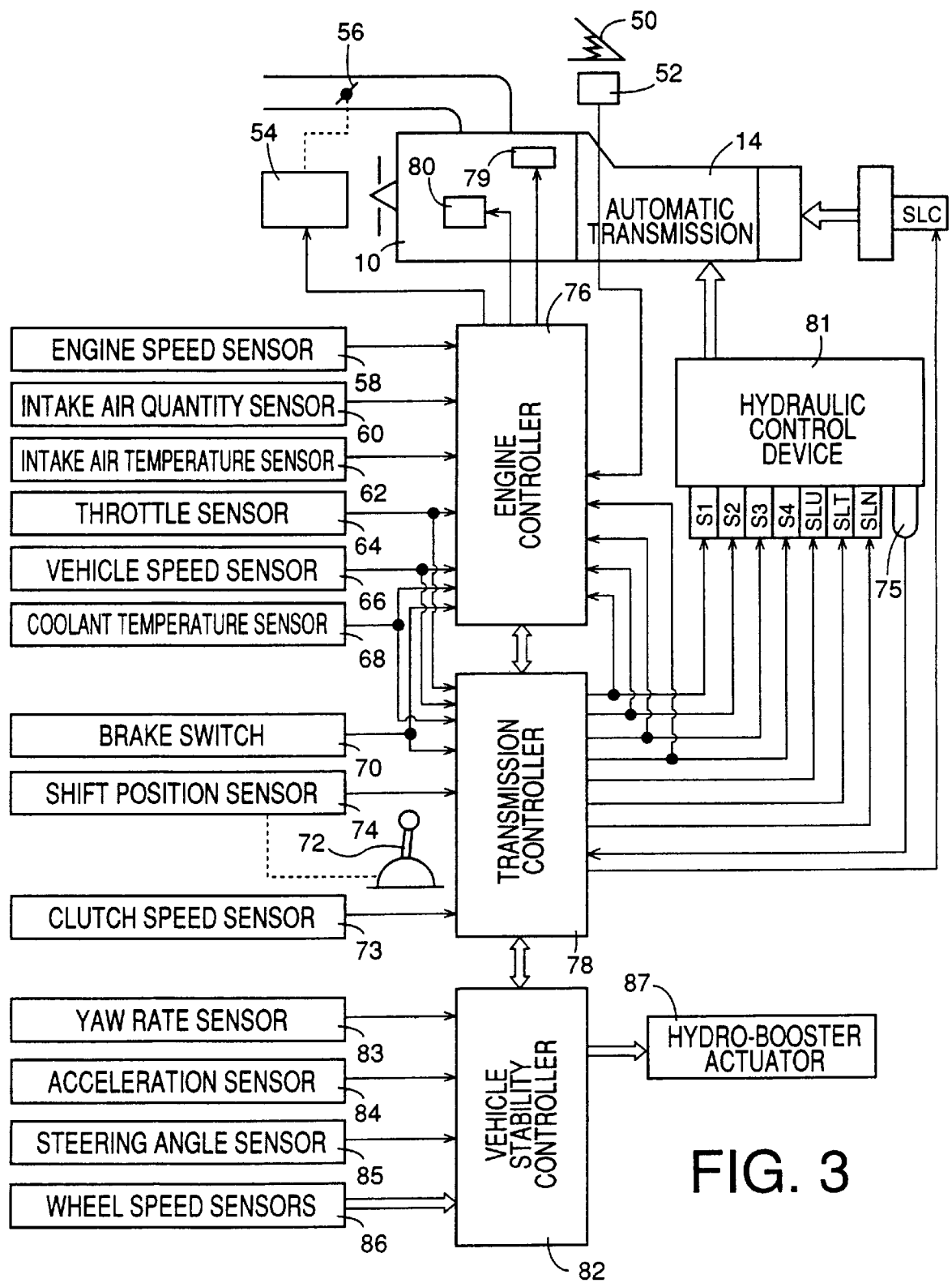
FIG. 3 is a block diagram illustrating an electrical system and a hydraulic control system of the vehicle control apparatus.

As shown in FIG. 3, the vehicle control apparatus uses various sensors including: an accelerator sensor 52 for detecting an amount of operation of an accelerator pedal 50, which amount is used to operate a throttle actuator 54 for controlling a throttle valve 56 disposed in an intake pipe of the engine 10; an engine speed sensor 58 for detecting a speed $N_E$ of the engine 10; an intake air quantity sensor 60 for detecting an intake air quantity Q/N of the engine 10; an intake air temperature sensor 62 for detecting a temperature $T_A$ of an intake air of the engine 10; a throttle sensor 64 for detecting an opening angle $\theta_{TH}$ of the throttle valve 56; a vehicle speed sensor 66 for detecting a speed $N_{OUT}$ of the output shaft 42 of the automatic transmission 14, which is used to obtain a running speed V of the vehicle; a coolant temperature sensor 68 for detecting a temperature $T_W$ of a coolant water of the engine 10; a BRAKE switch 70 for detecting an operating state BK of a braking system of the vehicle; a shift position sensor 74 for detecting a currently established position $P_{SH}$ of a shift lever 72 for the automatic transmission 14; a clutch speed sensor 73 for detecting a speed $N_{C0}$ of the clutch C0 of the first transmission unit 30; and an oil temperature sensor 75 for detecting a temperature $T_{OIL}$ of a working oil used for a hydraulic control device 81. The vehicle control apparatus includes an electronic engine controller 76 for controlling the engine 10, and an electronic transmission controller 78 for controlling the automatic transmission 14. These controllers 76, 78 receive the output signals of the above-indicated various sensors, which represent the engine speed $N_E$, intake air quantity Q/N, intake air temperature $T_A$, throttle valve opening angle $\theta_{TH}$, output shaft speed $N_{OUT}$ (vehicle speed V), engine coolant temperature $T_W$, brake operating state BK, shift lever position $P_{SH}$, clutch C0 speed $N_{C0}$, and working oil temperature $T_{OIL}$.

The engine controller 76 is constituted by a so-called microcomputer incorporating a central processing unit (CPU), a random-access memory (RAM), a read-only memory (ROM), and an input and output interface. The CPU operates to process the various input signals, according to control program stored in the ROM while utilizing a temporary data storage function of the RAM. The engine controller 76 controls: a fuel injector valve 79 for controlling the amount of injection of a fuel into the engine 10; an ignitor 80 for controlling an ignition timing of the engine 10; a suitable by-pass valve for controlling the idling speed of the engine 10; and the throttle valve 56 through the throttle actuator 54, for effecting traction control well known in the art, that is, for controlling the drive forces applied to the vehicle drive wheels. The engine controller 76 is connected to the transmission controller 78, and to an electronic vehicle stability controller 82, so that each of these controllers 76, 78, 80 may receive the necessary signals from the other controllers.

Figure 23:
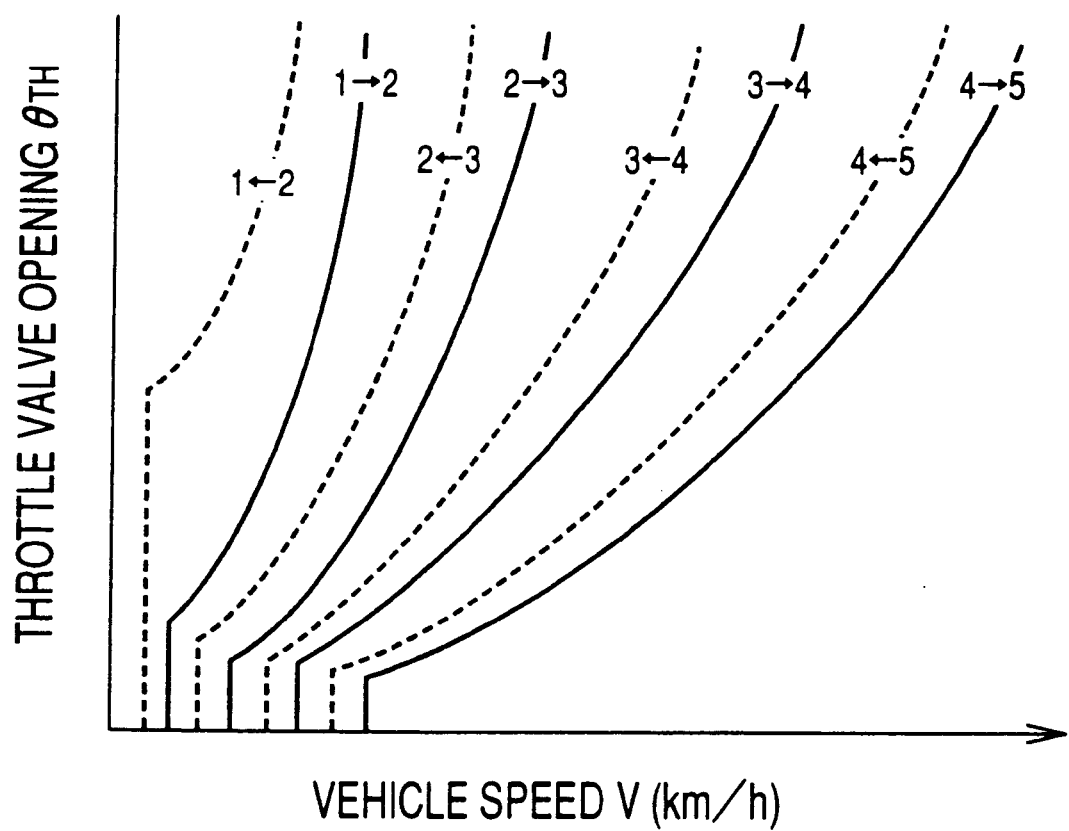
FIG. 23 is a view indicating shift patterns used by automatic transmission control means in the seventh embodiment of FIG. 21.

The transmission controller 78 is also constituted by a so-called microcomputer similar to that of the engine controller 76. The CPU of the transmission controller 78 operates to process the input signals according to control program stored in the ROM while utilizing a temporary data storage function of the RAM, for controlling solenoid-operated valves S1–S4 and linear solenoid valves SLU, SLT and SLN of the hydraulic control device 81. For example, the transmission controller 78 controls the linear solenoid-valve SLT so as to generate a THROTTLE pressure $P_{TH}$ corresponding to the opening angle $\theta_{TH}$ of the throttle valve 52, and controls the linear solenoid valve SLN so as to control an accumulator back pressure. The transmission controller 78 is also adapted to control the linear solenoid valve SLU for fully engaging or releasing the lock-up clutch 24 or controlling the amount of slip of the lock-up clutch 24, for controlling the brake B3, and for controlling the brakes B2 and B3 to shift up the automatic transmission 14 from the second-speed position "2nd" to the third-speed position "3rd" by simultaneously engaging and releasing the brakes B2 and B3, respectively, for instance. The above-indicated shift-up action of the automatic transmission 14 involving the simultaneous engaging and releasing actions of the brakes B2, B3 is referred to as a "clutch-to-clutch shifting action". The transmission controller 78 is arranged to select one of the forward-drive positions "1st" through "5th" of the automatic transmission 14, on the basis of the detected throttle opening angle $\theta_{TH}$ and vehicle speed V, and according to predetermined shift patterns stored in its ROM, as indicated in FIG. 23 by way of example. To establish the selected position of the automatic transmission 14, the transmission controller 78 controls the solenoid-operated valves S1, S2 and S3. When an engine brake is applied to the vehicle, the transmission controller 78 controls the solenoid-operated valve S4.

As also shown in FIG. 3, the vehicle stability controller 82 is adapted to receive the output signals of a yaw rate sensor 83, an acceleration sensor 84, a steering angle sensor 85 and four wheel speed sensors 86. The output signal of the yaw rate sensor 83 represents a yaw rate $\omega_Y$ of the vehicle body, i.e., an angular velocity about the vertical axis. The output signal of the accelerator sensor 84 represents an acceleration value G of the vehicle body in the longitudinal direction. The output signal of the steering angle sensor 85 represents a steering angle $\theta_W$, i.e., an angle of rotation of a steering wheel of the vehicle. The output signals of the four wheel speed sensors 86 represent rotating speeds $N_{W1}$–$N_{W4}$ of the four wheels of the vehicle, respectively. The vehicle stability controller 80 is also constituted by a microcomputer similar to those of the controllers 76, 78. The CPU of the vehicle stability controller 80 operates to process the input signals according to control programs stored in the ROM while utilizing a temporary data storage function of the RAM, for controlling the throttle valve 56 through the throttle actuator 54, and for controlling suitable solenoid-operated brake control valves provided in a hydro-booster actuator 87, to regulate braking pressures applied to wheel brake cylinders for the four wheels. The hybro-booster actuator 87, which is incorporated in the hydraulic braking system, is capable of controlling the braking forces acting on the four wheels as needed, independently of each other. As indicated above, the vehicle stability controller 80 is connected to the engine and transmission controllers 76, 78, for receiving the necessary signals from the controllers 76, 78.

Figure 4:
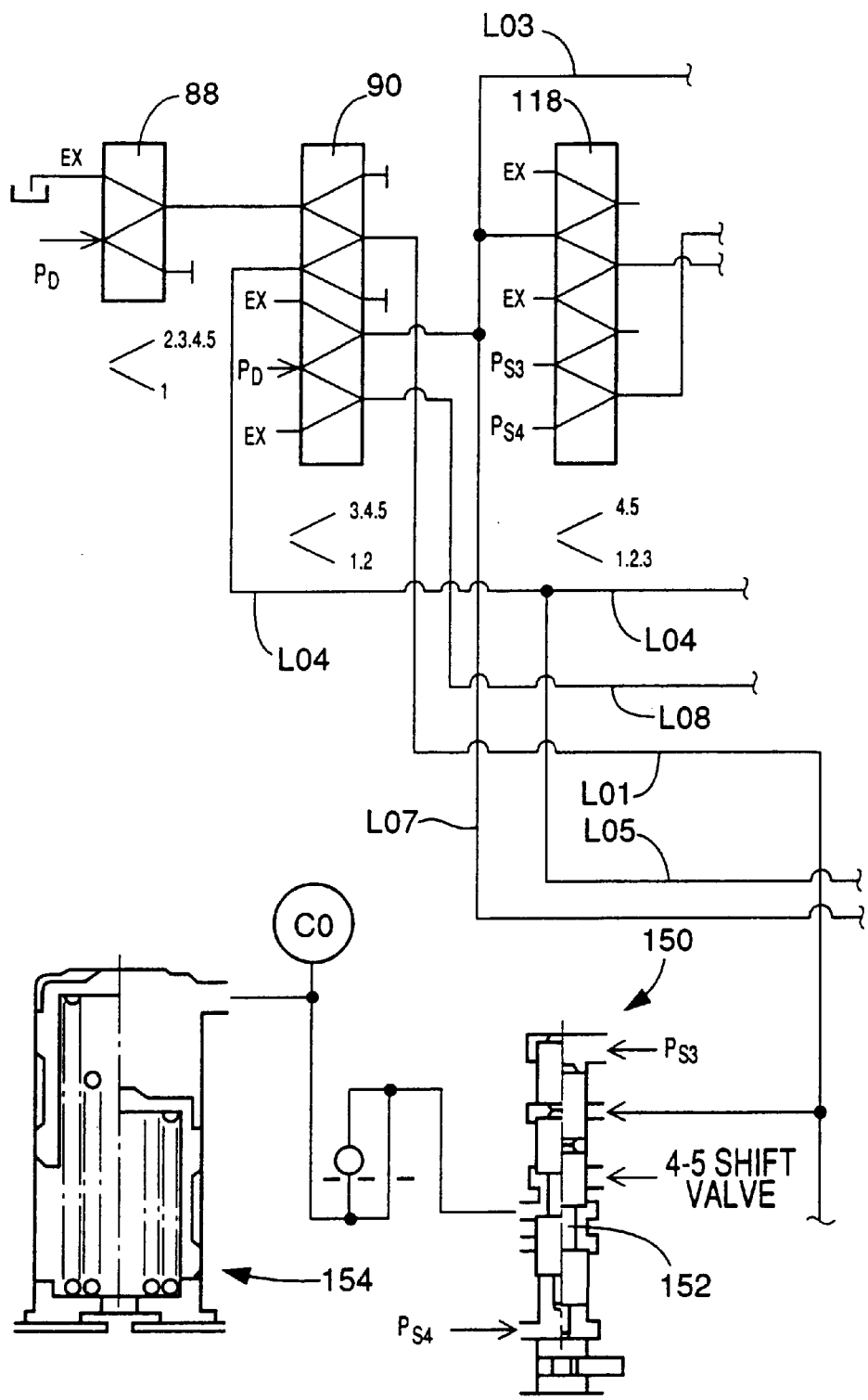
FIG. 4 is a view showing a part of the hydraulic control device shown in FIG. 3.
Figure 5:
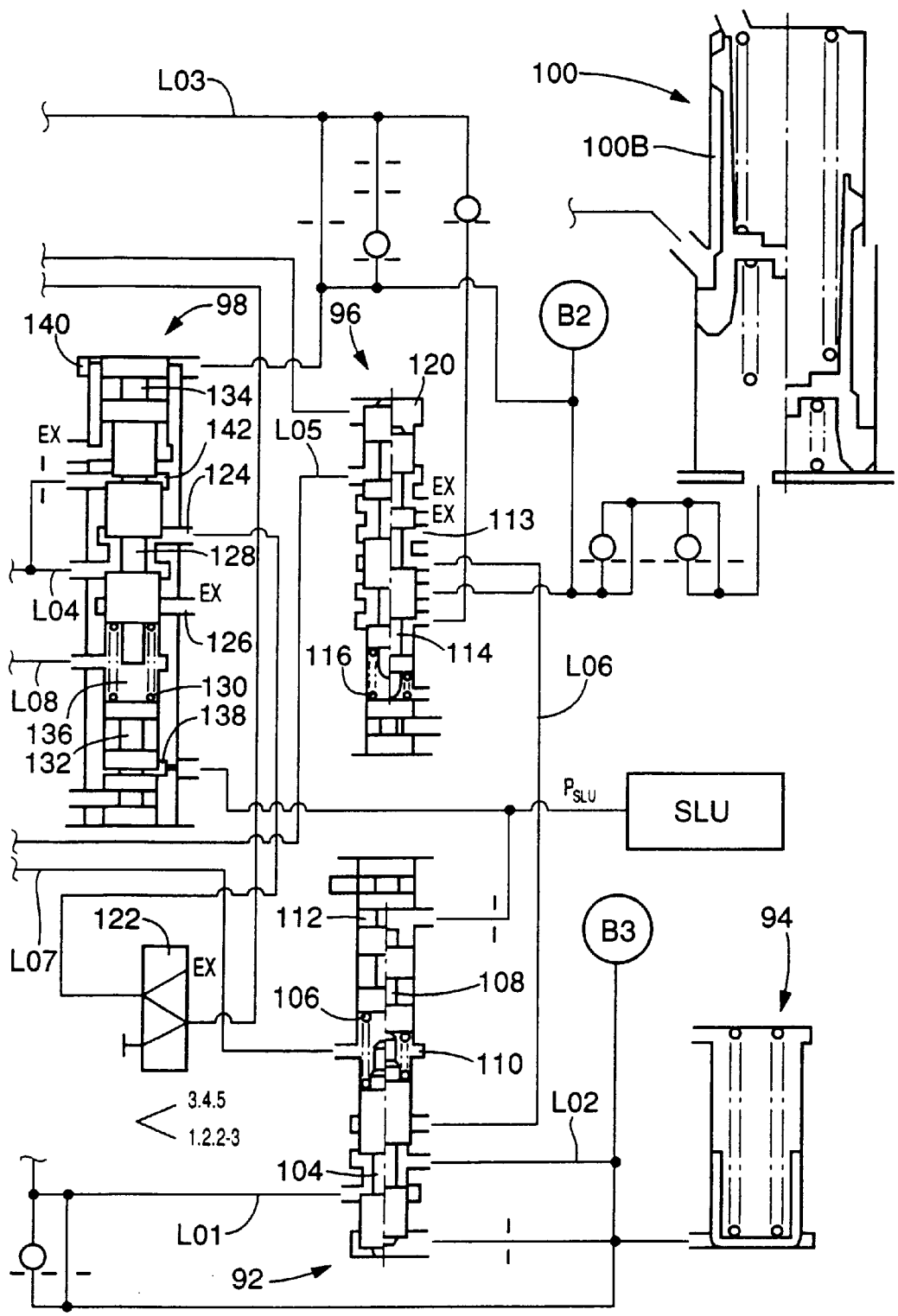
FIG. 5 is a view showing another part of the hydraulic control device.

Referring to FIGS. 4 and 5, there is shown a part of the hydraulic control device 81, which includes a 1–2 shift valve 88 and a 2–3 shift valve 90. These shift valves 88, 90 are operated on the basis of the output pressures of the solenoid-operated valves S1, S2, for shifting up the automatic transmission 14 from the first-speed position "1st" to the second-speed position "2nd", and from the second-speed position "2nd" to the third-speed position "3rd". Numerals indicated below the shift valves 88, 90 as shown in FIG. 4 represent the forward-drive positions of the automatic transmission 14. The 1–2 shift valve 88 receives a FORWARD-DRIVE pressure $P_D$ which is generated from a manual valve when the shift lever 72 is operated to one of forward-drive positions "D", "4", "3", "2" and "L". The FORWARD-DRIVE pressure $P_D$ is based on a line pressure $P_L$ which is regulated by a suitable pressure regulating valve such that the line pressure $P_L$ increases with an increase in the throttle opening angle $\theta_{TH}$.

When the transmission controller 78 generates a command to shift up the automatic transmission 14 from the first-speed position "1st" to the second-speed position "2nd", the FORWARD-DRIVE pressure $P_D$ is applied to the brake B3 through the 1–2 shift valve 88, 2–3 shift valve 90, a fluid passage L01, a B3-control valve 92 and a fluid passage L02. Reference numeral 94 in FIG. 5 denotes a damper. When the transmission controller 78 generates a command to shift up the automatic transmission 14 from the second-speed position "2nd" to the third-speed position "3rd", the FORWARD-DRIVE pressure $P_D$ is applied to the brake B2 and a B2 accumulator 100 through the 2–3 shift valve 90 and a fluid passage L03, while at the same time the brake B3 is drained under control through the fluid passage L02, B3 control valve 92, fluid passage L01, 2–3 shift valve 90, return passage L04 and 2–3 timing valve 98, and is rapidly drained through a fluid passage L05 branched from the return passage L04 and through the B2 orifice control valve 96.

The B2 accumulator 100 has a back pressure chamber 100B adapted to receive an accumulator back pressure $P_{ACC}$ upon each shifting action of the automatic transmission 14. The accumulator back pressure $P_{ACC}$ is generated by a suitable back pressure control valve (not shown) on the basis of an output pressure $P_{SLT}$ of the linear solenoid valve SLT and an output pressure $P_{SLN}$ of the linear solenoid valve SLN.

The B3 control valve 92 has: a spool 104 for selectively connecting the fluid passages L01 to and from the fluid passage L02; a spring 106; a large-diameter plunger 108 which is disposed concentrically with the spool 104 with the spring 106 interposed therebetween and which has a larger diameter than the spool 104; an oil chamber 110 which accommodates the spring 106 and which receives through a fluid passage L07 the FORWARD-DRIVE pressure $P_D$ generated from the 2–3 shift valve 90 when the 2–3 shift valve 90 is switched to its third-speed position; and an oil chamber 112 which is partially defined by an end face of the plunger 108 and which receives the output pressure P SLU of the linear solenoid valve SLU. When the automatic transmission 14 is shifted to the second-speed position "2nd", the spool 104 of the thus constructed B3 control valve 92 is first moved to its open position indicated in FIG. 5 on the left side of its centerline, by the output pressure $P_{SLU}$ of the linear solenoid valve SLU, to initially effect the fast filling of the brake B3. Then, the spool 104 is operated to raise a pressure $P_{B3}$ of the brake B3 on the basis of the output pressure $P_{SLU}$ and according to the following equation (1), by permitting the fluid to flow from the fluid passage L01 to the fluid passage L02 or from the fluid passage L02 to the fluid passage L06, whereby the hydraulic pressure $P_{B3}$ in the process of engagement of the brake B3 is slowly raised under the control of the B3 control valve 92, with a pressure damping effect as provided by an accumulator.

$$P_{B3} = P_{SLU} \cdot S1/S2 \quad (1)$$

where,

S1: cross sectional area of the plunger 108
S2: Cross sectional area of the spool 104

The linear solenoid valve SLU is adapted such that the output pressure $P_{SLU}$ increases with a duty ratio or percent $D_{SLU}$ as represented by a control signal which is applied from the transmission controller 78 to the linear solenoid valve SLU. It will be understood from the above equation (1) that the pressure $P_{B3}$ of the brake B3 is proportional to the output pressure $P_{SLU}$ of the linear solenoid valve SLU. Therefore, the brake $P_{B3}$ varies as a function of the duty ratio $D_{SLU}$.

The B2 orifice control valve 96 has: a drain port 113; a spool 114 for selectively connecting and disconnecting the brake B2 and the B2 accumulator 100 to and from the fluid passage L03, and selectively connecting the fluid passage (drain passage) L06 to and from the drain port 113; a spring 116 for biasing the spool 114 to a fast fill position; and an oil chamber 120 which is partially defined by an end face of the spool 114 and which receives an output pressure $P_{S3}$ of the third solenoid-operated valve S3 through a 3–4 shift valve 118. When the automatic transmission 14 is shifted down from the third-speed position "3rd" to the second-speed position "2nd", for example, the third solenoid-operated valve S3 is energized or turned ON, and the output pressure $P_{S3}$ is not applied to the oil chamber 120, so that the brake B2 and the B2 accumulator 100 are connected to each other by the spool 114, whereby fast draining of the brake B2 and the B2 accumulator 100 is effected. When the automatic transmission 14 is shifted up from the first-speed position "1st" to the second-speed position "2nd", the third solenoid-operated valve S3 is deenergized or turned OFF, and the output pressure $P_{S3}$ is applied to the oil chamber 120, so that the drain port 113 is connected to the drain passage L06 through which the fluid is discharged during operation of the B3 control valve 92. Namely, the B3 control valve 92 is permitted to operate to control the pressure $P_{B3}$. Upon termination of the shift-up action of the automatic transmission 14 from the first-speed position "1st" to the second-speed position "2nd", the third solenoid-operated valve S3 is energized or turned ON, and the fluid passage L06 is disconnected from the drain port 113, so that the pressure regulating operation of the B3 control valve 92 is inhibited.

The 2–3 timing valve 98 functions as a pressure regulating valve for regulating the pressure PB3 of the brake B3 in its releasing process according to the output pressure $P_{SLU}$ of the linear solenoid valve SLU, upon the shift-up action of the automatic transmission 14 from the second-speed position "2nd" to the third-speed position "3rd". The 2–3 timing valve has: an input port 124 which receives the FORWARD-DRIVE pressure $P_D$ from the 2–3 shift valve 90 through the 3–4 shift valve 118 and a solenoid-relay valve 122, when the automatic transmission 14 is commanded to be shifted up from the second-speed position "2nd" to the third-speed position "3rd"; a drain port 126; a spool 128 adapted to connect the fluid passage L04 selectively to the input port 124 or the drain port 126, for thereby regulating the pressure $P_{B3}$ of the brake B3 during its releasing action; a spring 130; a first plunger 132 which is disposed concentrically with the spool 128 with the spring 130 interposed therebetween and which has the same diameter as the spool 128; a second plunger 134 which is disposed concentrically with the spool 128 and abuttable against one end of the spool 128 and which has a larger diameter as the spool 128; an oil chamber 136 which accommodates the spring 130 and which receives through a fluid passage L08 the FORWARD-DRIVE pressure $P_D$ generated from the 2–3 shift valve 90 when the 2–3 shift valve 90 is operated to its second-speed position; a fluid chamber 138 which is partially defined by an end face of the first plunger 132 and which receives the output pressure $P_{SLU}$ of the linear solenoid valve SLU; an oil chamber 140 which is partially defined by an end face of the second plunger 134 and which receives the pressure $P_{B2}$ of the brake B2; and a feedback pressure chamber 142 which receives the output pressure of the valve 98.

The 2–3 timing valve 98 thus constructed operates to regulate the pressure $P_{B3}$ of the brake B3 in its releasing process for shifting up the automatic transmission 14 from the second-speed position "2nd" to the third-speed position "3rd", according to the following equation (2), such that the pressure $P_{B3}$ decreases with an increase in the engaging pressure $P_{B2}$ of the brake B2, and increases with an increase in the output pressure $P_{SLU}$ of the linear solenoid valve SLU.

$$P_{B3}=P_{SLU} \cdot S3/(S3-S4)-P_{B2} \cdot S5/(S3-S4) \tag{2}$$

where,

S3: cross sectional area of the spool 128 and the first plunger 132

S4: cross sectional area of the land of the spool 128 on the side of the second plunger 134

S5: cross sectional area of the second plunger 134

In the 2–3 timing valve 98, the spool 128 is locked when the FORWARD-DRIVE pressure $P_D$ generated from the 2–3 shift valve placed in its second-speed position is applied to the oil chamber 136. This arrangement is intended to prevent a change in the volume of the oil chamber 138 of the 2–3 timing valve connected to the oil chamber 112 of the B3 control valve 92, to thereby avoid an influence on the pressure regulating operation of the B3 control valve 92 when the automatic transmission 14 is placed in the first-speed position "1st" or second-speed position "2nd".

The hydraulic control device 81 further includes a C0 exhaust valve 150 having a spool 152 which is operated to a closed position thereof with the output pressure $P_{S3}$ of the third solenoid-operated valve S3 and the pressure in the fluid passage L01, and to an open position thereof with an output pressure $P_{S4}$ of the fourth solenoid-operated valve S4. When a 4–5 shift valve (not shown) is placed in a position for the positions "1st" through "4th", the line pressure $P_L$ received by the C0 exhaust valve 150 from the 4–5 shift valve is supplied to the clutch C0 and a C0 accumulator 154 when the automatic transmission 14 is placed in one of the positions "1st", "3rd" and "4th".

In the hydraulic control device 81 constructed as described above, the 1–2 shift valve 88 is operated from the second-speed position to the first-speed position when the automatic transmission 14 is commanded to be shifted down from the second-speed position "2nd" to the first-speed position "1st". As a result, the brake B3 is drained through the b3 control valve 92, fluid passage L01, 2–3 shift valve 90, fluid passage L04 and 203 timing valve 98. In the process of this 2–1 shift-down action of the automatic transmission 14, the engaging pressure $P_{B3}$ of the brake B3 is directly regulated by the B3 control valve 92, so that the pressure $P_{B3}$ is rapidly reduced to a predetermined level Pd, held at this level Pd for a predetermined length of time, and then continuously reduced at a predetermined rate down to the atmospheric pressure. The B3 control valve 92 is controlled according to the output pressure $P_{SLU}$ of the linear solenoid valve SLU, that is, according to the duty cycle ratio $D_{SLU}$ of the linear solenoid valve SLU. For instance, the predetermined level Pd is slightly higher than the level at which the brake B3 is fully released, and is determined principally on the basis of the input torque of the automatic transmission 14. To cope with the chronological change in the friction characteristic of the brake B3, however, the predetermined level Pd is adjusted or updated, by learning compensation, so as to achieve the 2–1 shift-down action of the automatic transmission 14 in the intended manner, for example, such that the time length from the moment of initiation of the 2–1 shift-down action to the moment of initiation of the releasing action of the brake B3 or to the moment of termination of the 2–1 shift-down action coincides with a predetermined target value.

When the automatic transmission 14 is commanded to effect a "clutch-to-clutch shifting action", for instance, 2–3 shift-up action, the 2–3 shift valve 90 is switched from its second-speed position to its third-speed position. As a result, the brake B3 is drained through the B3 control valve 92, fluid passage L01, 2–3 shift valve 90, fluid passage L04 and 2–3 timing valve 98, while at the same time the FORWARD-DRIVE pressure $P_D$ is applied to the brake B2 through the 2–3 shift valve 90 and fluid passage L)3. In the process of this 2–3 shift-up action of the automatic transmission 14, the engaging pressure $P_{B2}$ of the brake B2 is raised at a predetermined rate with the effect of the accumulator 100. After the highest pressure of the accumulator 100 is reached, the pressure $P_{B2}$ is rapidly raised. In the meantime, the engaging pressure $P_{B3}$ of the brake B3 is directly controlled by the B3 control valve 92 such that the pressure $P_{B3}$ is first rapidly reduced to the predetermined level Pd, then held at this level Pd for a predetermined pressure hold time, and then continuously reduced at a predetermined reduction rate ΔP down to the atmospheric pressure. The predetermined level Pd, pressure hold time and reduction rate ΔP are adjusted or updated, by learning compensation, so that the amount of overshoot of the engine 10 (temporary abrupt rise of the engine speed $N_E$) or the amount of tie-up of the automatic transmission 14 (temporary abrupt drop of the output shaft torque) is held within a predetermined optimum range.

Figure 6:
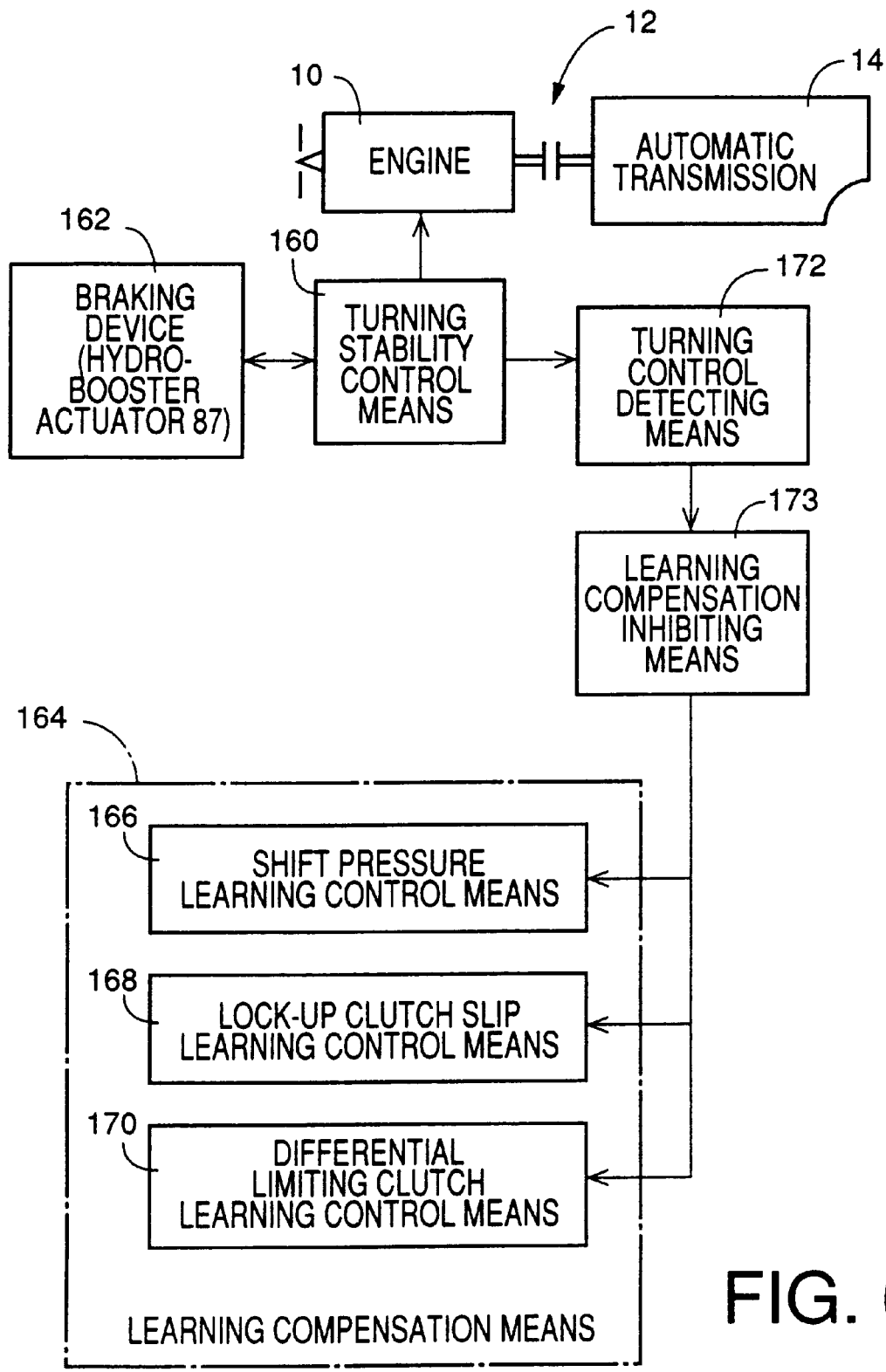
FIG. 6 is a block diagram illustrating various functional means of the vehicle control apparatus according to the first embodiment.
Figure 18:
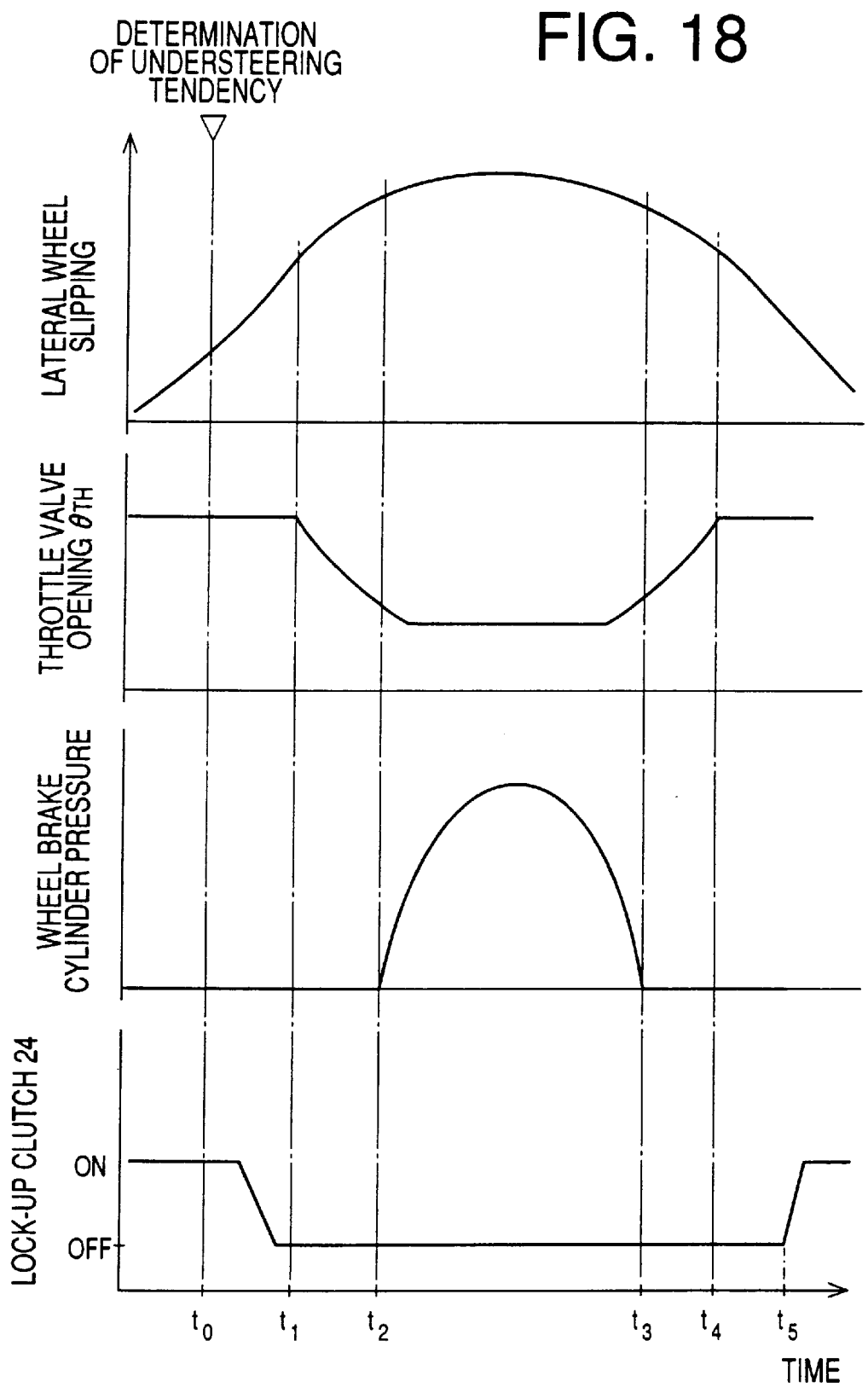
FIG. 18 is a time chart for explaining a turning stability control operation performed by turning stability control means in the embodiment of FIG. 15.

Referring next to the block diagram of FIG. 6, there are shown functional means of the vehicle stability controller 78 which cooperates with the engine and transmission controllers 76, 78 to constitute the vehicle control apparatus. The vehicle stability controller 82 includes running stability control means in the form of turning stability control means 160, learning compensation means 164, running control detecting means in the form of turning control detecting means 172, and learning compensation inhibiting means 173. The braking device 162 includes the hydro-booster actuator 87, which is capable of controlling the braking forces acting on the four wheels of the vehicle independently of each other as described above. The turning stability control means 160 controls a braking device 162 (including the hydro-booster actuator 87) to control the braking forces acting on the vehicle wheels (braking pressures applied to wheel brake cylinders), as shown in FIG. 18, or alternatively controls the throttle actuator 54 to reduce the opening angle $\theta_{TH}$ of the throttle valve 56, as also shown in FIG. 18, for thereby reducing the engine output, so that the lateral slip of the wheels is reduced for increasing the stability of turning of the vehicle.

In the present first embodiment, the turning stability control means 160 is adapted to determine that the vehicle is suffering from an oversteering tendency, if a slip angle β between the longitudinal direction of the vehicle and the direction of movement of the gravity center of the vehicle is larger than a predetermined upper limit, while a rate of change dβ/dt of the slip angle β is higher than a predetermined upper limit. In this case, the turning stability control means 160 commands the braking device 162 to brake one of the front wheels which is on the outer side of the turning path of the vehicle, in order to generate a moment for reducing the oversteering tendency and thereby improving the turning stability of the vehicle while at the same time lowering the vehicle speed V to increase the running stability. Further, the turning stability control means 160 is adapted to determine that the vehicle is suffering from an understeering tendency, if the detected yaw rate $\omega_Y$ of the vehicle is lower than a threshold determined by the steering angle $\theta_W$ and vehicle speed V. In this instance, the turning stability control means 160 commands the throttle actuator 54 to reduce the throttle opening angle $\theta_{TH}$ for reducing the engine output, and controls the braking device 162 to brake the rear wheels, in order to generate moment for reducing the understeering tendency and thereby improving the vehicle turning stability.

The learning compensation means 164 is adapted to effect learning compensation of selected parameters associated with some hydraulically operated frictional coupling devices provided in the power transmitting system. Described more specifically, the learning compensation means 164 includes shift pressure learning control means 166, lock-up clutch slip learning control means 168 and differential limiting clutch learning control means 170. The shift pressure learning control means 166 is adapted to effect learning compensation of the pressure or pressures of the hydraulically operated frictional coupling devices which are operated to shift the automatic transmission 14, for instance, the pressure $P_{B3}$ of the brake B3 so as to achieve the 2–1 shift-down action or 2–3 shift-up action of the automatic transmission 14 in the intended manner, for example, such that the time length from the moment of initiation of the shift-down or shift-up action to the moment of initiation of the releasing action of the brake B3 or to the moment of termination of the shift-down or shift-up action coincides with a predetermined value. For instance, the pressure $P_{B3}$ of the brake B3 which is directly controlled by the B3 control valve 92 is compensated by the, shift pressure learning control means 166 in the process of the 2–3 shift-up action in which the brake B3 is released while at the same time the brake B2 is engaged. The pressure $P_{B3}$ is compensated such that the amount of overshoot of the engine 10 which is a temporary rise of the engine speed $N_E$, or the amount of tie-up of the automatic transmission 14 which is a temporary drop of the torque of the output shaft 42 is held within the predetermined optimum range.

As described above, the lock-up clutch 24 which is a hydraulically operated frictional coupling device is provided for direct connection between the pump impeller (input rotary member) 18 and the turbine impeller (output rotary member) 22 of the torque converter 12 which is a fluid-operated power transmitting device disposed between the engine 10 and the automatic transmission 14. Under a predetermined running condition of the vehicle, the amount of slip of the lock-up clutch 24 is controlled in a slip control mode by the transmission controller 78. The lock-up clutch slip learning control means 168 is adapted to compensate a portion of a feed forward term included in a control equation which is used by the transmission controller 78 to control the amount of slip of the lock-up clutch 24 such that the actual slip amount coincides with a predetermined target value, irrespective of a change in the friction characteristic of the lock-up clutch 24.

As described above, the differential limiting clutch 49 which is also a hydraulically operated frictional coupling device is provided in the center differential gear device 45, for limiting the differential function of the center differential gear device 45, in order to control the distribution of the drive force to the front and rear drive wheels, depending upon the running condition of the vehicle. The differential limiting clutch learning control means 170 is adapted to effect learning compensation of a hydraulic pressure to be applied to the differential limiting clutch 49, for adjusting the squeezing force of the clutch 49 so as to assure the desired distribution ratio of the drive force to the front and rear wheels, irrespective of a change in the friction characteristics of the clutch 49.

The learning compensation means 164 may further include learning control means as disclosed in JP-A-150050, JP-A-2-42265, JP-A-5-296323 and JP-A-6-331016.

The turning control detecting means 172 is provided to detect an operation of the turning stability control means 160, on the basis of the outputs of the vehicle stability controller 82, for example. The learning compensation inhibiting means 173 is provided to disable the learning compensation means 164, that is, inhibit an operation of the learning compensation means 164, if the operation of the turning stability control means 160 is detected by the turning control detecting means 172.

Figure 7:
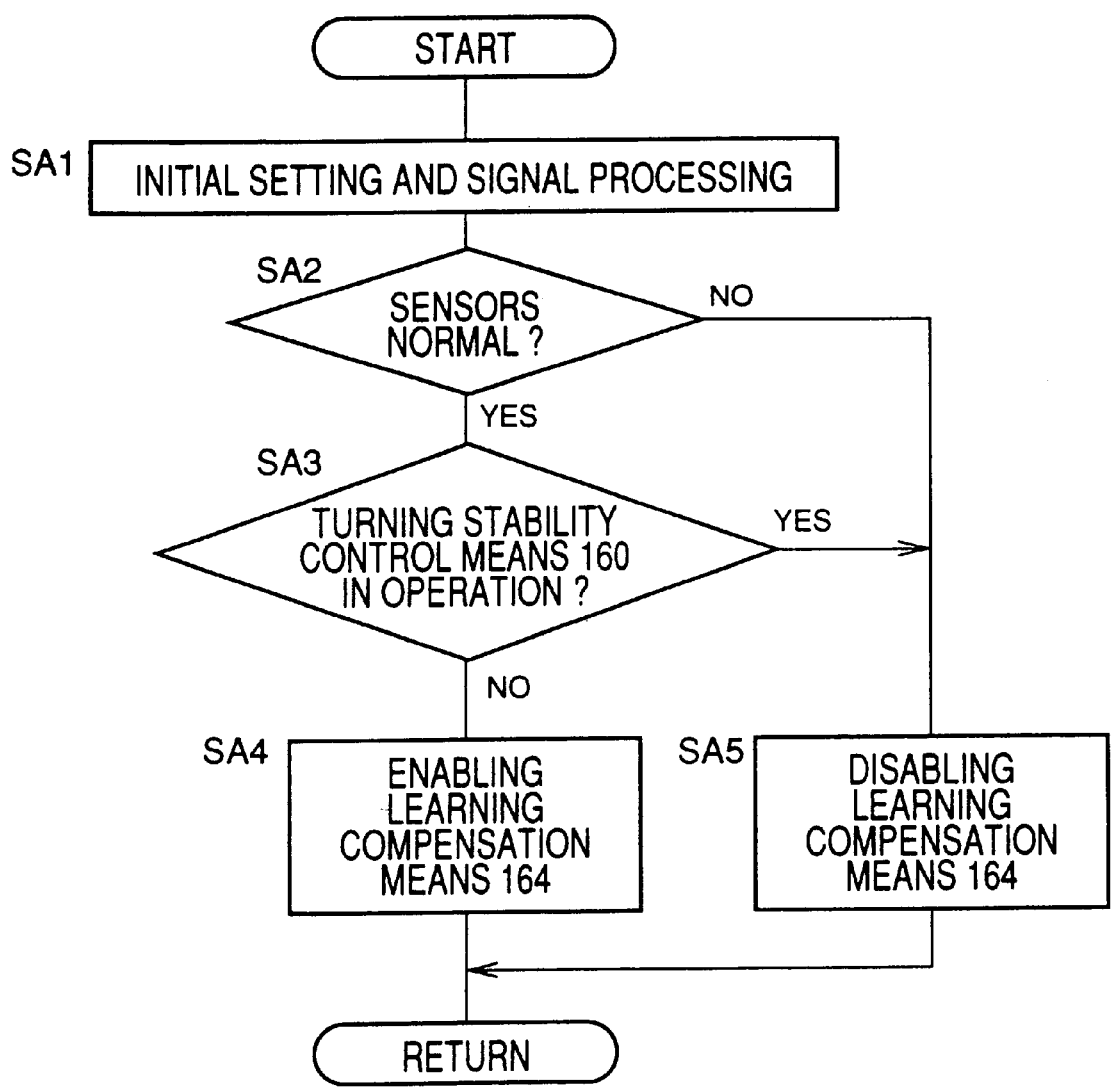
FIG. 7 is a flow chart illustrating a control routine executed by the vehicle control apparatus.

Referring to the flow chart of FIG. 7, a control routine executed by the vehicle stability controller 82 will be described. The control routine is initiated with step SA1 in which various counters and flags are cleared and various input signals are read and processed. Step SA1 is followed by step SA2 to determine whether the various sensors described above by reference to FIG. 3 are normally functioning. If a negative decision (NO) is obtained in step SA2, the learning compensation by the learning compensation means 164 may not be effected correctly. In this case, the control flow goes to step SA5 to disable the learning compensation means 164, that is, inhibit the operation of the learning compensation means 164.

If an affirmative decision (YES) is obtained in step SA2, the control flow goes to step SA3 corresponding to the turning control detecting means 172, to determine whether the turning stability control means 160 is in operation. This determination is effected on the basis of the signals which are sent from the vehicle stability controller 78 to the turning stability control means 160, for instance. If a negative decision (NO) is obtained in step SA3, the control flow goes to step SA4 to enable the learning compensation means 164 to normally function, that is, permit the operation of the learning compensation means 164. If an affirmative decision (YES) is obtained in step SA3, it means that the turning stability control means 160 is operating to activate the braking device 162 or control the throttle actuator 54. In this case, the control flow goes to step SA5 corresponding to the learning compensation inhibiting means 173, to inhibit the operation of the learning compensation means 164 during operation of the turning stability control means 160.

In the present vehicle control apparatus, the operation of the learning compensation means 164 is inhibited by the learning compensation inhibiting means 173 (step SA5) when the turning control detecting means 172 (step SA3) detects the operation of the turning stability control means 160. Therefore, the pressure $P_{B3}$, the equation to control the amount of slip of the lock-up clutch 24 and the pressure to be applied to the differential limiting clutch 49 are not erroneously compensated by the learning compensation means 164 while the throttle actuator 54 and the braking device 162 are controlled by the turning stability control means 160. Thus, the present vehicle control apparatus is effective to prevent control instability or shifting shock of the power transmitting system due to erroneous compensation of the control parameters of the power transmitting system. In other words, the present vehicle control apparatus does not suffer from drawbacks due to interference or inadequate coordination between the operation of the turning stability control means 160 and the controls of the torque converter 12 (equipped with the lock-up clutch 24), automatic transmission 14 and differential limiting clutch 49.

Figure 8:
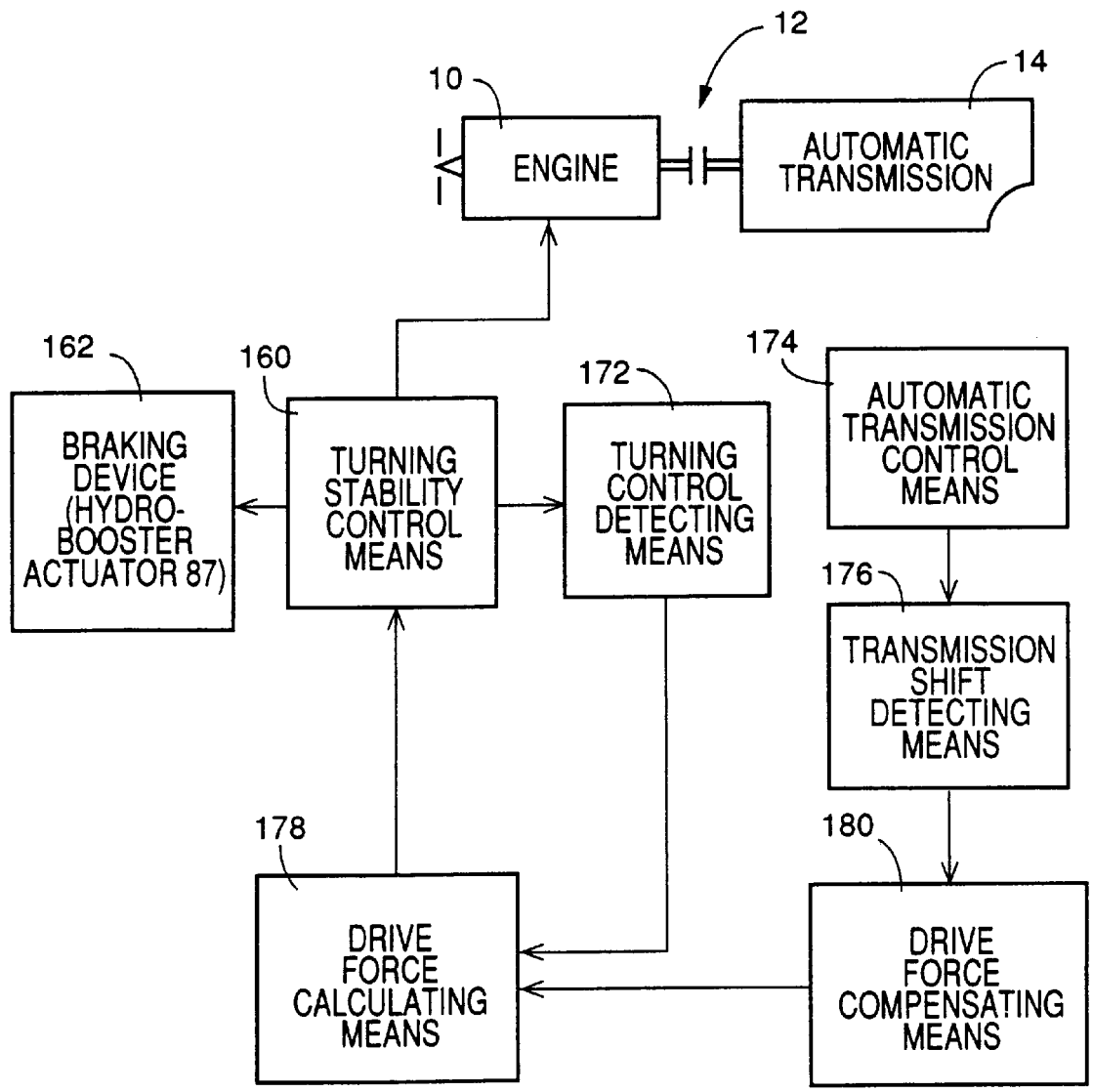
FIG. 8 is a block diagram corresponding to that of FIG. 6, illustrating various functional means of a vehicle control apparatus according to a second embodiment of the invention.
Figure 9:
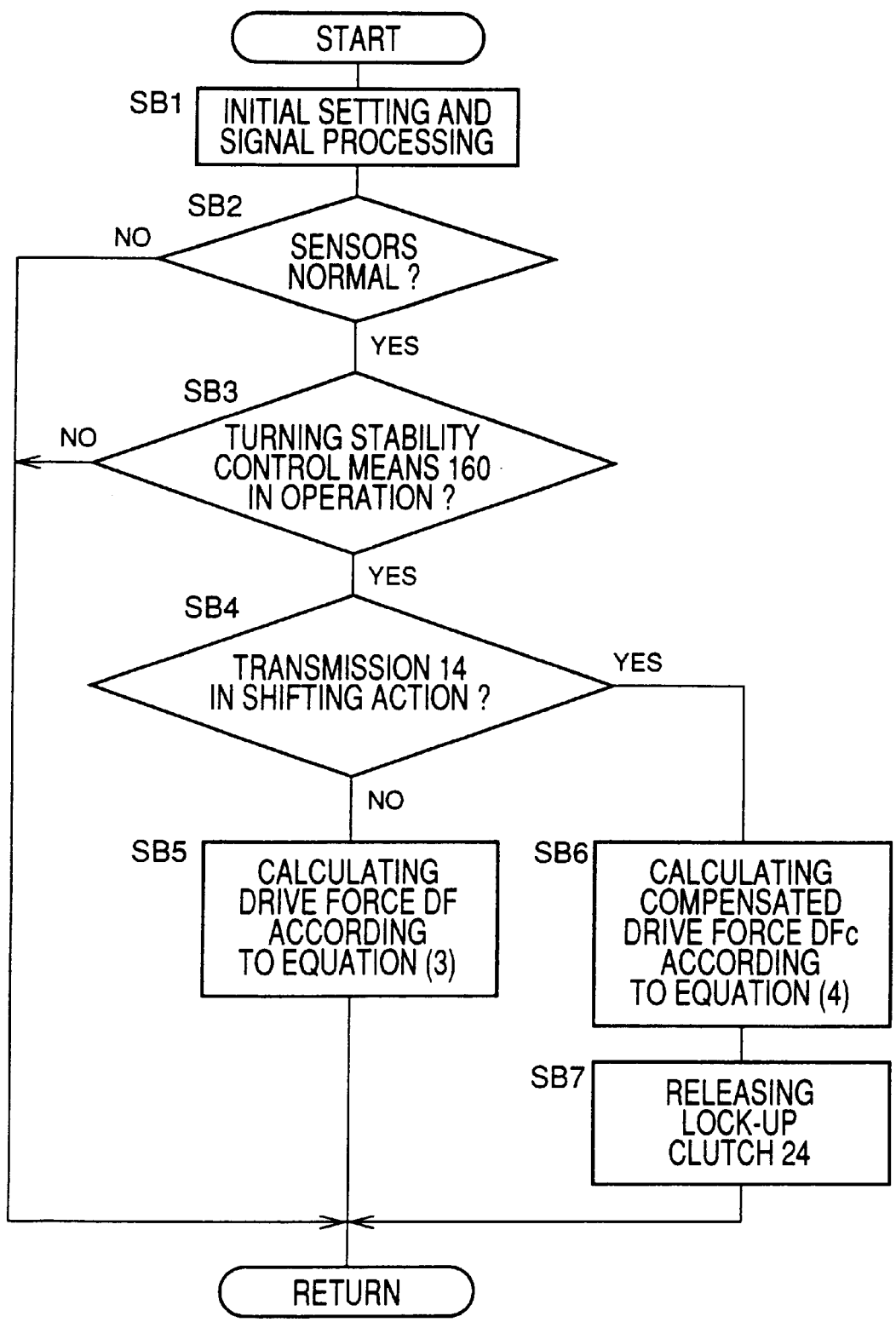
FIG. 9 is a flow chart corresponding to that of FIG. 7, illustrating a control routine executed by the apparatus of the second embodiment of FIG. 8.

Referring next to FIGS. 8–10, there will be described a vehicle control apparatus according to the second preferred embodiment of this invention. In this second embodiment, the same reference numerals as used in the first embodiment will be used to identify the functionally corresponding elements, and redundant description of these elements will not be provided.

As shown in FIG. 8, the vehicle control apparatus in the present second embodiment includes automatic transmission control means 174, transmission shift detecting means 176, drive force calculating means 178 and drive force compensating means 180, in addition to the turning stability control means 160 and the turning control detecting means 172 which are provided in the first embodiment.

The automatic transmission control means 174 is adapted to select one of the five forward-drive positions "1st" through "5th" of the automatic transmission 14, on the basis of the detected throttle opening angle $\theta_{TH}$ and vehicle running speed V, and according to predetermined stored basic shift boundary lines consisting of a plurality of shift-up boundary lines indicated by solid lines in FIG. 23 and a plurality of shift-down boundary lines indicated by broken lines in FIG. 23. Described more specifically, the automatic transmission control means 174 determines whether the automatic transmission 14 should be shifted up or down from the currently established position to another, by determining whether the point defined by the detected values $\theta_{TH}$ and V has moved across the shift-up or shift-down boundary line which corresponds to the currently established position of the automatic transmission 14. The automatic transmission control means 174 generates control signals for controlling the solenoid-operated valves S1, S2 and S3 so as to establish the newly selected position of the automatic transmission 14.

The transmission shift detecting means 176 is adapted to detect a shifting action of the automatic transmission 14 while the vehicle is running in an "accelerator-on" mode in which an output of the engine 10 is transmitted to the vehicle drive wheels. The shifting action may be detected depending upon whether the control signals for controlling the valves S1, S2, S3 to shift up or down the automatic transmission have been generated from the automatic transmission control means 174 of the transmission controller 78 and are held present.

The drive force calculating means 178 is operated when an operation of the turning stability control means 160 is detected by the turning control detecting means 172. The drive force calculating means 178 is adapted to calculate a drive force DF currently acting on the vehicle, according to the following equation (3), for example, on the basis of the actual output torque of the engine 10, a torque ratio t of the torque converter 12, a speed ratio $i_g$ of the automatic transmission 14, and a speed reduction ratio $i_f$ of the differential gear device:

$$DF=[f(GN)+f(GN_{FWD})-M]\times t\times i_g\times i_f \quad (3)$$

The first term $[f(GN)+f(GN_{FWD})-M]$ of the right member of the above equation (3) represents the effective output (output torque) of the engine 10. The value GN represents the intake air quantity of the engine, and the value $GN_{FWD}$ is a feed-forward compensating value for the intake air quantity, while the value M represents a sum of a torque loss of the engine and a load acting on an air conditioner or other optional device provided on the vehicle. On the basis of the drive force DF thus calculated by the drive force calculating means 178, the turning stability control means 160 operates to improve the stability of turning of the vehicle. The drive force calculating means 178 may be adapted to calculate the drive force DF according to a torque estimating method as disclosed in JP-A-5-164233, JP-A-5-77660 and JP-A-5-65843.

The drive force compensating means 180 is operated when an operation of the turning stability control means 160 is detected by the turning control detecting means 172 and when a shifting action of the automatic transmission 14 is detected by the transmission shift detecting means 176. The drive force compensating means 180 is adapted to compensate the drive force DF as calculated by the drive force calculating means 178, depending upon an influence of the shifting action on the actual value of the drive force DF acting on the drive wheels. For instance, the drive force compensating means 180 calculates a compensated drive force DFc according to the following equation (4):

$$DFc=[f(GN)+f(GN_{FWD})-M]\times t\times i_g\times i_f + I\Delta\omega \quad (4)$$

In the above equation (4), the value $I\Delta\omega$ is a product of a moment of inertia I of a rotary member of the automatic transmission 14 whose speed varies during the shifting action, and a rate of change $\Delta\omega$ of an angular velocity of that rotary member. The product $I\Delta\omega$ represents a drive force based on the inertia torque during the shifting action of the automatic transmission 14. To obtain the product $I\Delta\omega$ during the shifting action, the drive force compensating means 180 obtains the rate of change $\Delta\omega$ of the angular velocity of the rotary member at a predetermined cycle time.

Referring to the flow chart of FIG. 9, a control routine executed by the vehicle stability controller 82 will be described. The control routine is initiated with step SB1 in which various counters and flags are cleared and various input signals are read and processed. Step SB1 is followed by step SB2 to determine whether the various sensors are normally functioning. If a negative decision (NO) is obtained in step SB2, one cycle of execution of the routine is terminated. If an affirmative decision (YES) is obtained in step SB2, the control flow goes to step SB3 corresponding to the turning control detecting means 172, to determine whether the turning stability control means 160 is in operation. This determination is effected on the basis of the output signals of the vehicle stability controller 82. If a negative decision (NO) is obtained, one cycle of execution of the routine is terminated. If an affirmative decision (YES) is obtained in step SB4, the control flow goes to step SB4 corresponding to the transmission shift detecting means 176, to determine whether the automatic transmission 14 is in the process of a shifting action while the vehicle is running in the "accelerator-on" mode.

If a negative decision (NO) is obtained in step SB4, the control flow goes to step SB5 corresponding to the drive force calculating means 178, to calculate the drive force DF according to the above-indicated equation (3), which includes the value $I\Delta\omega$ representative of the drive force based on the inertia torque in the shifting action of the automatic transmission 14. If an affirmative decision (YES) is obtained in step SB4, on the other hand, the control flow goes to step SB6 corresponding to the drive force compensating means 180, to calculate the compensated drive force DFc according to the above-indicated equation (4), which includes the value $I\Delta\omega$. That is, the drive force compensating means 180 compensates the drive force DF as calculated by the drive force calculating means 178, depending upon an influence of the shifting action on the actual value of the drive force acting on the drive wheels. Step SB6 is followed by step SB7 to fully release the lock-up clutch 23, namely, to inhibit the operation of the lock-up clutch 24 in the slip control mode which would deteriorate the accuracy of calculation of the drive force DF.

In the vehicle control apparatus according to the present second embodiment of the invention, the drive force compensating means 180 (step SB6) is operated when a shifting action of the automatic transmission 14 is detected by the transmission shift detecting means 176 (step SB4), to compensate the drive force DF as calculated by the drive force calculating means 178, depending upon the inertia torque in the shifting action of the automatic transmission 14, which has an influence on the actual drive force acting on the drive wheels. This arrangement is effective to assure a sufficiently high degree of accuracy of control of the vehicle drive force by the turning stability control means 160 on the basis of the engine output torque, for example, even when the drive force control is effected during the shifting action of the automatic transmission, that is, even when the automatic transmission 14 is in the inertia phase of the shifting action in which the vehicle drive force varies due to the inertia torque. Therefore, the present vehicle control apparatus does not suffer from drawbacks due to interference or inadequate coordination between the operation of the turning stability control means 160 and the control of the automatic transmission 14.

In the 2–3 shift-up action of the automatic transmission 14, which is a so-called "clutch-to-clutch shifting action", for example, the output torque of the automatic transmission 14 tends to increase, as indicated in FIG. 10, due to an inertia torque in the inertia phase in which the brake B3 in the process of being released and the brake B2 in the process of being engaged are both partially engaged with slipping actions. To obtain the compensated drive force DFc in the inertial phase, step SB6 of FIG. 9 may be modified to replace the value $I\Delta\omega$ in the above equation (4) by a compensating value A which is an average of the output torque of the automatic transmission 14 in the inertia phase. The compensating value A may be obtained by adding a predetermined value to a drive value B calculated by the drive force calculating means 178 immediately after the 2–3 shift-up action has been commanded and immediately before the 2–3 shift-up action is initiated. Alternatively, the compensating value A may be obtained by multiplying the drive force value B by a predetermined increase ratio (larger than one).

Figure 12:
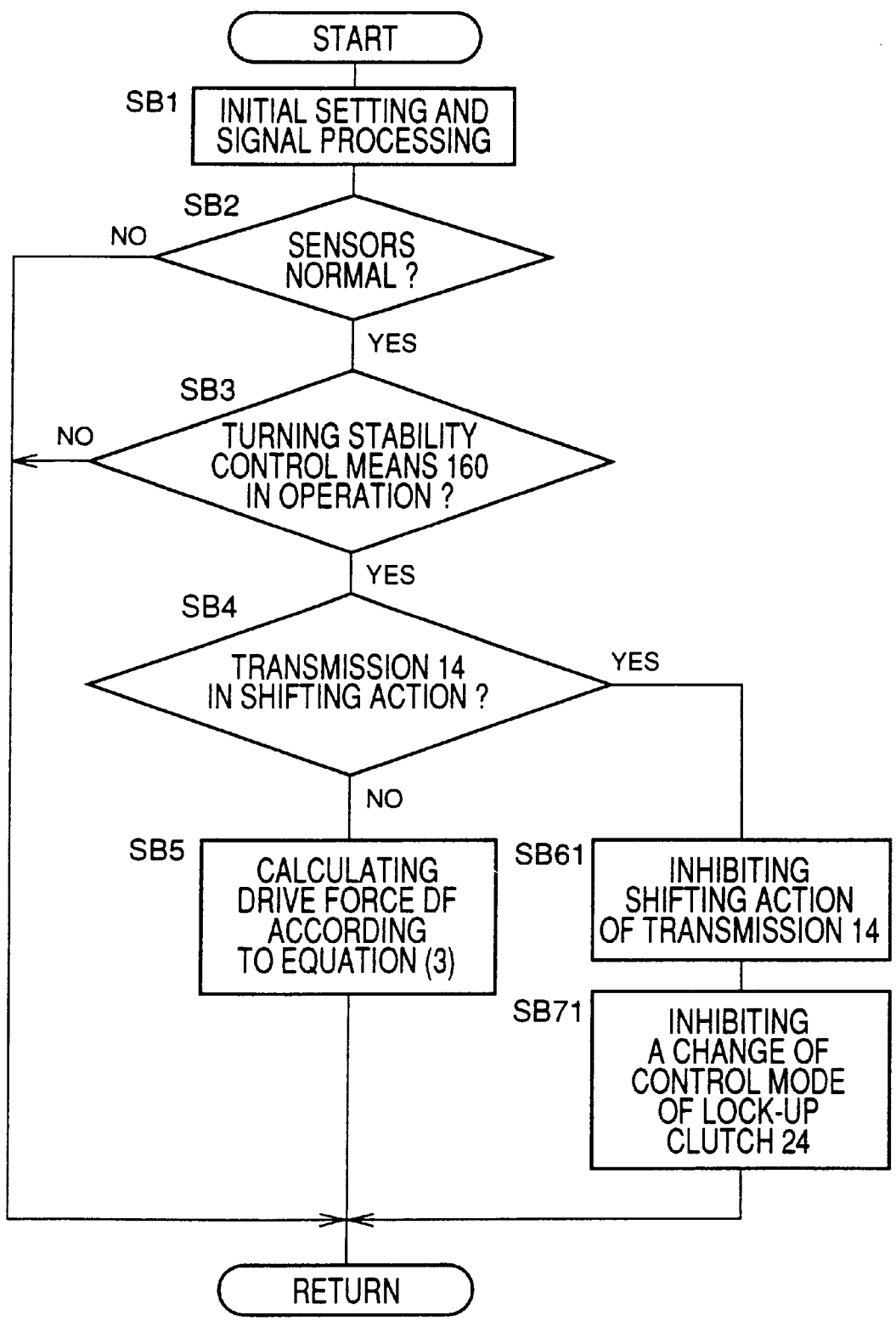
FIG. 12 is a flow chart corresponding to that of FIG. 7, illustrating a control routine executed by the apparatus of the third embodiment of FIG. 11.

Referring next to FIGS. 11 and 12, there will be described a vehicle control apparatus according to the third preferred embodiment of this invention. As shown in the block diagram of FIG. 11, the vehicle control apparatus in the present second embodiment includes power transmission state change restricting means 184, in addition to the turning stability control means 160, braking device 162, turning control detecting means 172, automatic transmission control means 174 and transmission shift detecting means 176 which are provided in the second embodiment.

The power transmission state change restricting means 184 is operated when an operation of the turning stability control means 160 is detected by the turning control detecting means 172. The power transmission state change restricting means 184 is adapted to restrict a change in the power transmission state of the power transmitting system (12, 14, 45, etc.), during operation of the turning stability control means 160. For instance, the power transmission state change restricting means 184 inhibits a shifting action of the automatic transmission 14, to thereby restrict a change in the speed ratio of the automatic transmission 14. Further, the restricting means change inhibits a change of the control mode of the lock-up clutch 24 between the fully released and engaged modes and the slip control mode, or a change between the fully released and engaged modes. The restricting means 184 may be adapted to fully release the lock-up clutch 24 for thereby inhibiting the slip control of the lock-up clutch 24. The restricting means 184 may be adapted to inhibit a change of the control mode of the differential limiting clutch 49 of the center differential gear device 45, for restricting a change in the power transmission state of the power transmitting system.

The vehicle control apparatus according to the third embodiment is adapted to execute a control routine illustrated in the flow chart of FIG. 12. This control routine includes the same steps SB1–SB5 as in the routine of of FIG. 9, but includes steps SB61 and SB71 which are different from steps SB6 and SB6 in the routine of FIG. 9. Namely, if the affirmative decision (YES) is obtained in step SB3 corresponding to the turning control detecting means 172 and also in step SB4 corresponding to the transmission shift detecting means 176, the control flow goes to steps SB61 and SB71 corresponding to the power transmission state change restricting means 184. In other words, if a shifting action of the automatic transmission 14 is detected during operation of the turning stability control means 160, this shifting action is inhibited in step SB61, and a change of the control mode of the lock-up clutch 24 is inhibited in step SB71.

In the vehicle control apparatus according to the third preferred embodiment of the invention, the power transmission state change restricting means 184 (steps SB61, SB71) is operated to restrict a change in the power transmission state of the power transmitting system (12, 14, 45, etc.) when an operation of the turning stability control means 160 is detected by the turning control detecting means 172 (step SB3). This arrangement is effective to assure a sufficiently high accuracy of control of the vehicle drive force by the turning stability control means 160 on the basis of the engine output torque, for example, even when the torque ratio t of the torque converter 12 is changed in relation to the operating state of the lock-up clutch 24. Therefore, the present vehicle control apparatus does not suffer from drawbacks due to interference or inadequate coordination between the operation of the turning stability control means 160 and the control of the lock-up clutch 24.

Figure 13:
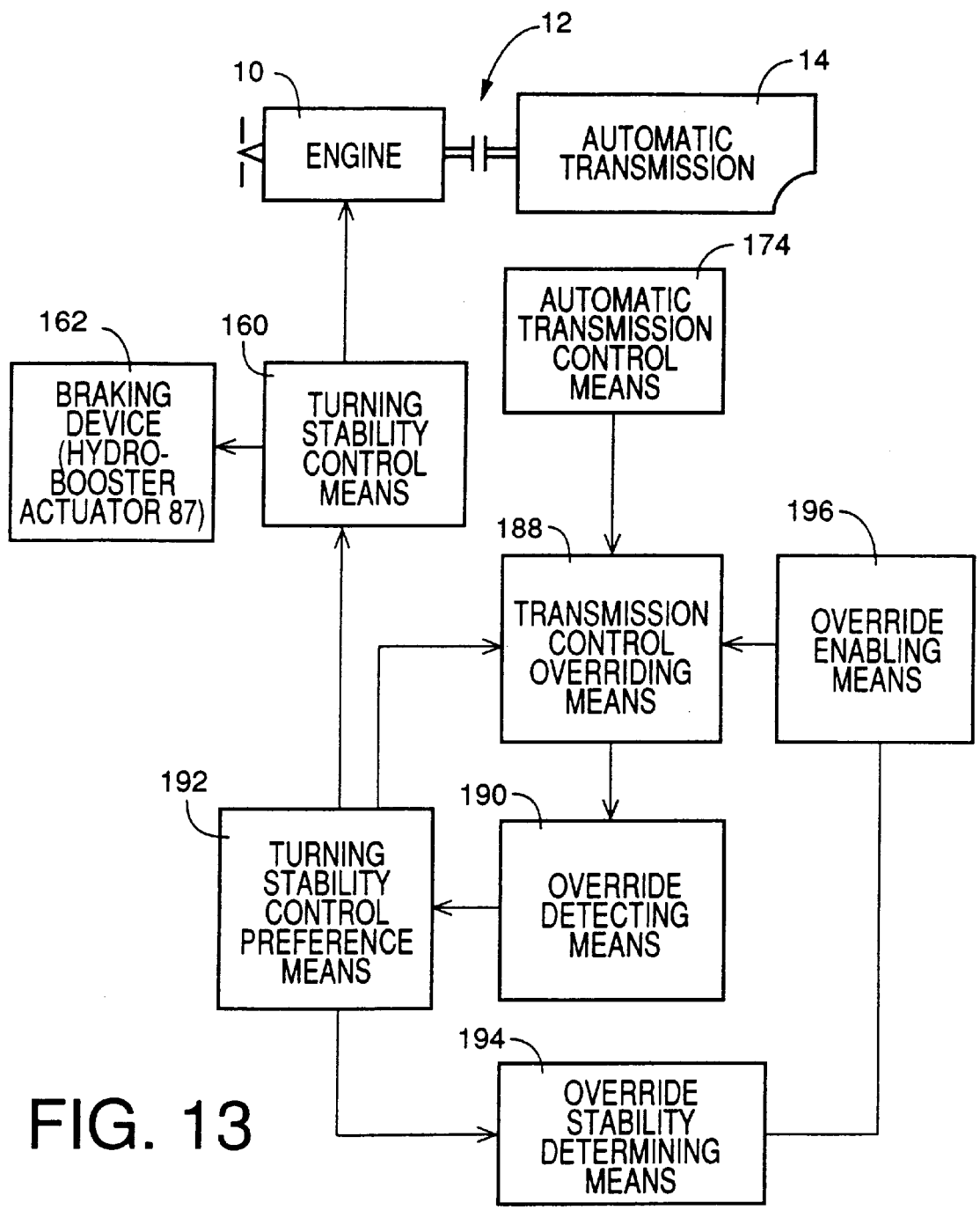
FIG. 13 is a block diagram corresponding to that of FIG. 6, illustrating various functional means of a vehicle control apparatus according to a fourth embodiment of the invention.
Figure 14:
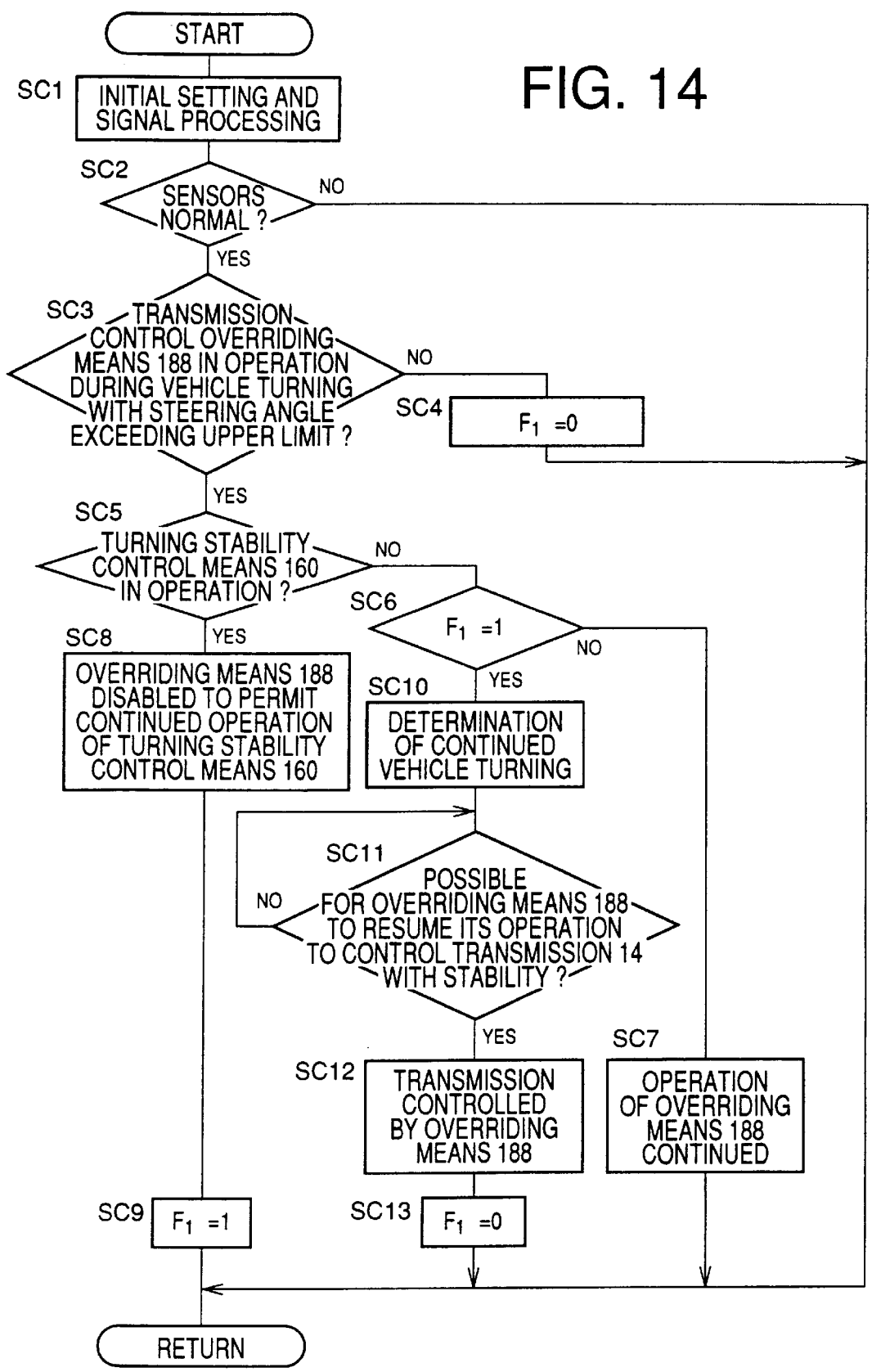
FIG. 14 is a flow chart corresponding to that of FIG. 7, illustrating a control routine executed by the apparatus of the fourth embodiment of FIG. 13.

Referring next to FIGS. 13 and 14, there will be described a fourth embodiment of this invention. As shown in the block diagram of FIG. 13, the present vehicle control apparatus includes transmission control overriding means 188, override detecting means 190, running stability control preference means in the form of turning stability control preference means 192, override stability determining means 194, and override enabling means 196, in addition to the turning stability control means 160, braking device 162 and automatic transmission control means 174 which are provided in the third embodiment of FIG. 11.

The transmission control overriding means 188 is adapted to override the automatic transmission control means 174, that is, control the automatic transmission 14 in a manner different from the normal control by the automatic transmission control means 174, while the vehicle is running in a predetermined condition, for instance, while the vehicle is turning with its steering angle exceeding a predetermined upper limit, and/or when the vehicle is running on an uphill or downhill road whose surface gradient is outside a predetermined range. For instance, the transmission control overriding means 188 holds the automatic transmission 14 in its position which is established when the vehicle running in the predetermined condition is initiated. In this case, the automatic transmission 14 is kept in this position as long as the vehicle running is running in the predetermined condition, even if the automatic transmission control means 174 determines that the automatic transmission 14 should be shifted to another position.

The override detecting means 190 is adapted to detect an operation of the transmission control overriding means 188 to override the automatic transmission control means 174. The turning stability control preference means 192 is adapted to disable the transmission control overriding means 188 and commands the turning stability control means 170 to perform its operation for improving the stability of turning of the vehicle, when the operation of this means 188 is detected by the override detecting means 190.

The override stability determining means 194 is operated upon termination of the operation of the turning stability control means 160 initiated by said turning stability control preference means 192. The override stability determining means 194 is adapted to determine whether an operation of the transmission control overriding means 188 can be resumed with stability without a considerable shifting shock of the automatic transmission 14. For instance, the override stability determining means 194 determines that the operation of the transmission control overriding means 188 can be resumed with stability, if the vehicle is running with the throttle opening angle $\theta_{TH}$ being lower than a predetermined threshold, or if the position of the automatic transmission 14 to be selected by the transmission overriding means 188 is the same as the position to be normally selected by the automatic transmission control means 174. If the override stability determining means 194 determines that the operation of the transmission control overriding means 188 can be resumed with stability, the override enabling means 196 enables the transmission control overriding means 188 to operate for controlling the automatic transmission 14.

Referring to the flow chart of FIG. 14, a control routine executed by the vehicle stability controller 82 will be described. The control routine is initiated with step SC1 in which various counters and flags are cleared and various input signals are read and processed. Step SC1 is followed by step SC2 to determine whether the various sensors are normally functioning. If a negative decision (NO) is obtained in step SC2, one cycle of execution of the routine is terminated. If an affirmative decision (YES) is obtained in step sC2, the control flow goes to step SC3 corresponding to the override detecting means 190, to determine whether the vehicle is turning with the steering angle exceeding the predetermined upper limit. This upper limit is determined to increase with an increase in the vehicle running speed V. If an affirmative decision (YES) is obtained in step SC3, it means that the transmission control overriding means 188 is operating to hold the automatic transmission 14 in the currently established position.

If a negative decision (NO) is obtained in step SC3, the control flow goes to step SC4 to reset a flag F1 to "0", and one cycle of execution of the routine of FIG. 14 is terminated. When the flag F1 is set at "1", it indicates that the turning stability control means 160 is in operation.

When the affirmative decision (YES) is obtained in step SC3, the control flow goes to step SC5 to determine whether the turning stability control means 160 is in operation. Before the operation of the turning stability control means 160 is initiated, a negative decision (NO) is obtained in step SC5, and the control flow goes to step SC6 to determine whether the flag F1 is set at "1". Since a negative decision (NO) is obtained in step SC6 before the operation of the turning stability control means 160, the control flow then goes to step SC7 in which the operation of the transmission control overriding means 188 is continued, that is, the overriding means 188 remains in the enabled state to hold the automatic transmission 14 in the same position as long as the steering angle of the vehicle is larger than the predetermined upper limit.

When the operation of the turning stability control means 160 is initiated, an affirmative decision (YES) is obtained in step SC5, and the control flow goes to step SC8 corresponding to the turning stability control preference means 192, in which the transmission control overriding means 188 is disabled to permit the turning stability control means 160 to continue its operation for improving the stability of turning of the vehicle. Step SC8 is followed by step SC9 in which the flag F1 is set to "1".

When the operation of the turning stability control means 160 is terminated, the negative decision (NO) is obtained in step SC5, and the control flow goes to step SC6. In this case, an affirmative decision (YES) is obtained in step SC6, and the control flow goes to step SC10 to determine that the vehicle is still turning with the steering angle exceeding the upper limit. Step SC10 is followed by step SC11 corresponding to the override stability determining means 194, to determine whether the operation of the transmission control overriding means 188 can be resumed to control the automatic transmission 14 with stability without a shifting shock thereof. This determination is effected by determining whether the throttle opening angle $\theta_{TH}$ is smaller than the predetermined threshold. If the throttle opening angle $\theta_{TH}$ is smaller than the predetermined threshold, it means that the operation of the transmission control overriding means 188 can be resumed to hold the automatic transmission 14 in the currently established position. Step SC11 is repeatedly implemented until an affirmative decision (YES) is obtained in step SC11. When the affirmative decision is obtained in step SC11, the control flow goes to step SC12 corresponding to the override enabling means 196, to enable the transmission control overriding means 188, that is, to permit the operation of the transmission control overriding means 188 to be resumed for holding the automatic transmission 14 in the same position as long as the vehicle is turning with the steering angle exceeding the upper limit. Then, the control flow goes to step SC13 to reset the flag F1 to "0", and one cycle of execution of the routine of FIG. 14 is terminated.

In the vehicle control apparatus according to the fourth preferred embodiment of this invention, the turning stability control preference means 192 (step SC8) is operated to disable the transmission control overriding means 188 and permit the operation of the turning stability control means 160 to be continued, when the operation of the transmission control overriding means 188 is detected by the override detecting means 190 (step SC3) during the vehicle running in the predetermined condition, for instance, during the vehicle turning with the steering angle exceeding the upper limit. This arrangement is effective to prevent an interference between the operation of the turning stability control means 160 to reduce the throttle opening angle $\theta_{TH}$ and/or shift-up the automatic transmission 14, and the operation of the transmission control overriding means 188 adapted to override the automatic transmission control means 174 and hold the automatic transmission 14 in the currently established position during the vehicle running in the predetermined condition.

Further, the present vehicle control apparatus is adapted such that upon termination of the turning stability control means 160, the override stability determining means 194 (step SC11) is operated to determine whether the operation of the transmission control overriding means 188 can be resumed with stability without a shifting shock of the automatic transmission 14, and such that when the affirmative decision is obtained by the override stability determining means 194, the override enabling means 196 (step SC12) is operated to enable the transmission control overriding means 188 to operate for holding the automatic transmission 14 in the same position. Thus, the control of the automatic transmission 14 by the transmission control overriding means 188 can be resumed with stability without the shifting shock.

Although step SC3 is formulated to determine whether the vehicle is turning with the steering angle exceeding the predetermined upper limit, step SC3 may be formulated to determine whether the vehicle is running on an uphill or a downhill road whose surf ace gradient is outside a predetermined range. In other words, the transmission control overriding means 188 may be operated during running of the vehicle on such an uphill or downhill road surface.

Figure 15:
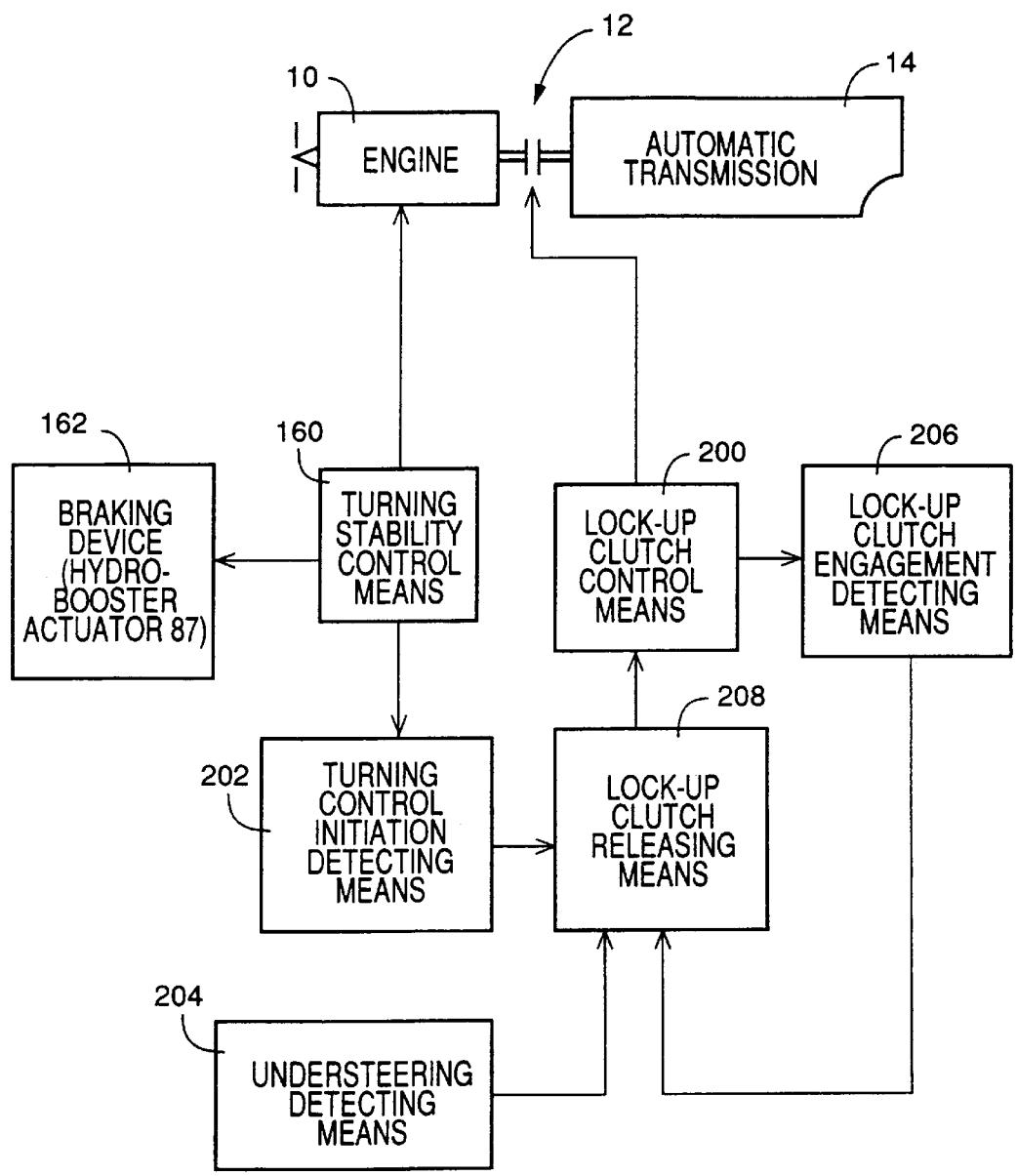
FIG. 15 is a block diagram corresponding to that of FIG. 6, illustrating various functional means of a vehicle control apparatus according to a fifth embodiment of the invention.

Referring next to FIGS. 15–18, there will be described a vehicle control apparatus according to a fifth embodiment of this invention, which includes lock-up clutch control means 200, running control initiation detecting means in the form of turning control initiation detecting means 202, understeering detecting means 204, lock-up clutch engagement detecting means 206 and lock-up clutch releasing means 208, as shown in the block diagram of FIG. 15, in addition to the turning stability control means 160 and the braking device 162 which are provided in the preceding embodiments.

Figure 17:
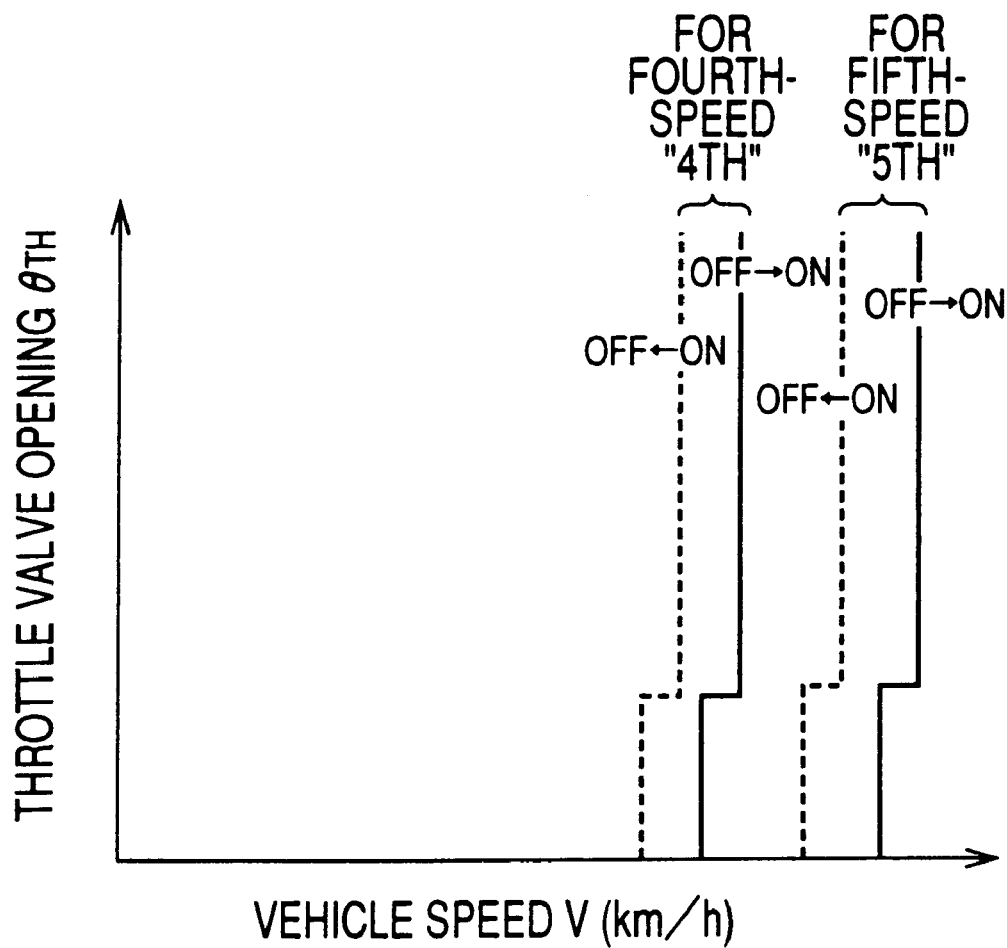
FIG. 17 is a view indicating a relationship used to control a lock-up clutch provided in the power transmitting system in the embodiment of FIG. 15.

The lock-up clutch control means 100 is adapted to determine whether the lock-up clutch 24 should be placed in the engaged position (ON state) or in the released position (OFF state). This determination is effected on the basis of the detected vehicle speed and throttle opening angle $\theta_{TH}$ and according to stored predetermined relationships between the engaged and released positions (ON and OFF states) and the parameters V, $\theta$TH, as indicated in the graph of FIG. 17, by way of example. The lock-up clutch control means 100 is further adapted to control the hydraulic pressure of the lock-up clutch 24 according to a result of the above determination. The turning control initiation detecting means 202 is adapted to detect an initiation of an operation of the turning stability control means 160. The understeering detecting means 204 is adapted to detect an understeering state of the vehicle, namely, detect that the yaw rate $\omega_Y$ of the vehicle during running thereof is larger than a predetermined upper limit. The lock-up clutch engagement detecting means 206 is adapted to detect that the lock-up clutch 24 is placed in its engaged position under the control of the lock-up clutch control means 200.

The lock-up clutch releasing means 208 is adapted to release the lock-up clutch 24 when the initiation of an operation of the turning stability control means 160, the understeering of the vehicle and the engagement of the lock-up clutch 24 are detected by the turning control initiation detecting means 202, the understeering detecting means 204 and the lock-up clutch engagement detecting means 206, respectively. Described in detail, the lock-up clutch releasing means 208 fully releases the lock-up clutch 24 as soon as the operation of the turning stability control means 160 has been initiated to reduce the engine output or activate the braking device 162, namely, before the engine output is reduced or before the brake is applied to the vehicle. The releasing means 208 holds the lock-up clutch 24 in the fully released position as long as the turning stability control means 160 is operated.

Figure 16:
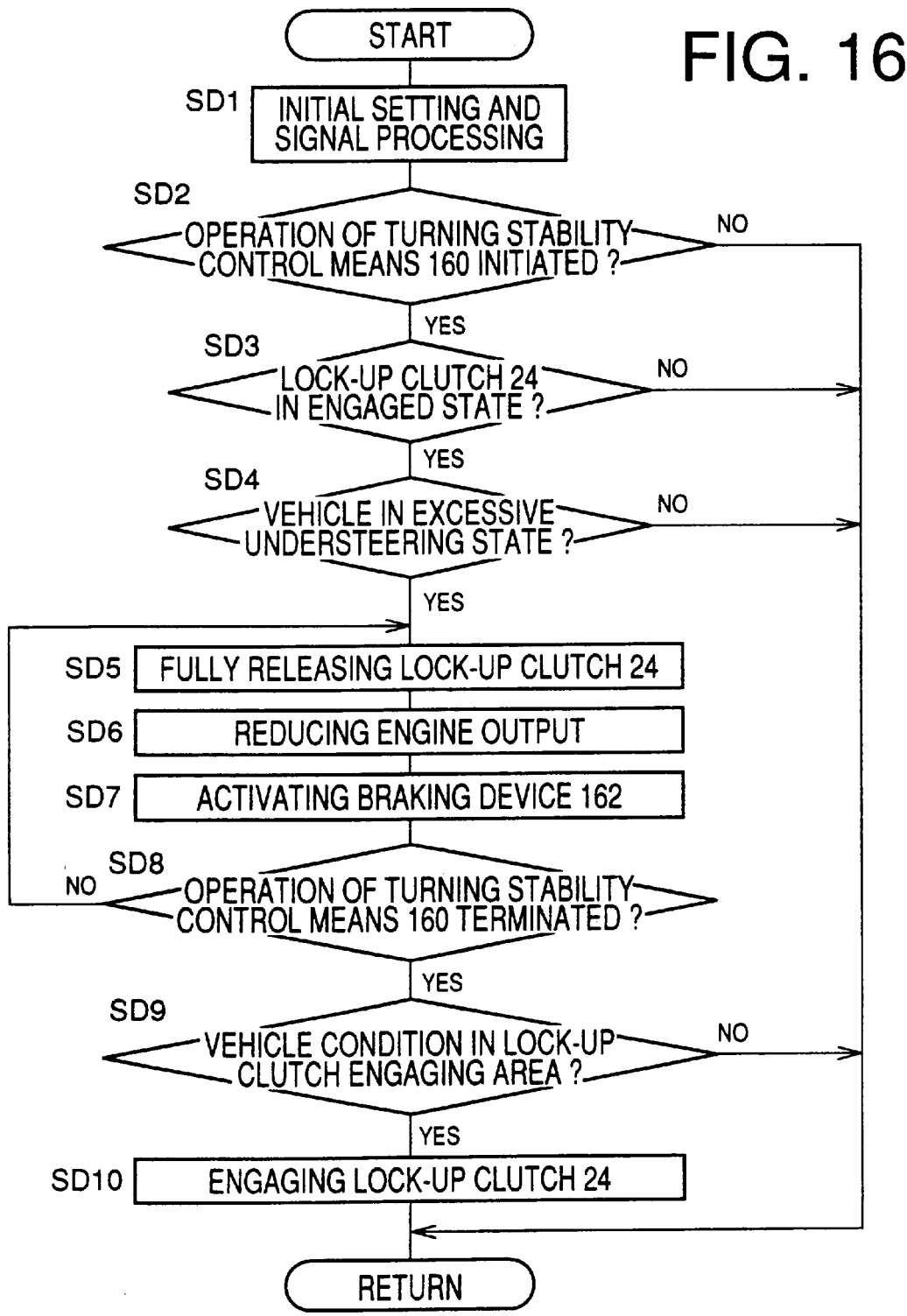
FIG. 16 is a flow chart corresponding to that of FIG. 7, illustrating a control routine executed by the apparatus of the fifth embodiment of FIG. 15.

The present vehicle control apparatus is adapted to execute a control routine illustrated in the flow chart of FIG. 16. The routine is initiated with step SD1 similar to step SA1 of the routine of FIG. 6, to effect the initial setting and signal processing. Step SD1 is followed by step SD2 corresponding to the turning control initiation detecting means 202, to determine whether an operation of the turning stability control means 160 has been initiated. If an affirmative decision (YES) is obtained in step SD2, the control flow goes to step SD3 corresponding to the lock-up clutch engagement detecting means 206, to determine whether the lock-up clutch 24 is placed in the engaged position under the control of the lock-up clutch control means 200. If an affirmative decision (YES) is obtained in step SD3, the control flow goes to step SD4 corresponding to the understeering detecting means 204, to determine whether the vehicle is turning in an excessive understeering state. If a negative decision (NO) is obtained in any one of the above steps SD2, SD3 and SD4, one cycle of execution of the routine of FIG. 16 is terminated.

If the affirmative decision (YES) is obtained in all of the three steps SD2, SD3 and SD4, the control flow goes to step SD5 corresponding to the lock-up clutch releasing means 208, to fully release the lock-up clutch 24 before the engine output is reduced and the brake is applied by the turning stability control means 160. In an example of FIG. 18, the lock-up clutch 24 is released between points of time t0 and t1. Then, the control flow goes to steps SD6 and SD7 in which the turning stability control means 160 reduces the engine output and activate the braking device 162, as indicated at t1 and t2 in FIG. 18.

Step SD7 is followed by step SD8 to determine whether the operation of the turning stability control means 160 is terminated. If a negative decision (NO) is obtained in step SD8, the control flow goes back to step SD5, and steps SD5–SD8 are repeatedly implemented until an affirmative decision (YES) is obtained in step SD8. When the affirmative decision is obtained in step SD8, as indicated at t4 in FIG. 4, the control flow goes to step SD9 to determine whether the vehicle running condition (a point defined by the detected throttle opening angle $\theta_{TH}$ and vehicle speed V) is in the lock-up clutch engaging area. This determination is effected on the basis of the detected values $\theta_{TH}$ and V and according to the predetermined relationship as illustrated in FIG. 17, for example. If a negative decision (NO) is obtained in step SD9, one cycle of execution of the routine of FIG. 16 is terminated. If an affirmative decision (YES) is obtained in step SD9, the control flow goes to step SD10 in which the lock-up clutch 24 which has been released in step SD5 is engaged again, as indicated at t5 in FIG. 18.

In the vehicle control apparatus according to the present fifth preferred embodiment of the invention, the lock-up clutch 24 is released by the lock-up clutch releasing means 208 (step SD5) when the initiation of an operation of the turning stability control means 160 is detected by the turning control initiation detecting means 202 (step SD2). This arrangement is effective to prevent generation of a shock even when the engine speed is rapidly lowered by the turning stability control means 160, which is operated as a result of occurrence of an excessive understeering tendency of the vehicle, so as to reduce the throttle opening angle $\theta_{TH}$ and apply a brake to one of the front wheels which is on the outer side of the turning path of the vehicle.

Since the lock-up clutch 24 is released by the lock-up clutch releasing means 208 (step SD5) before the reduction of the engine output and the brake application are effected by the turning stability control means 160, a delay of the releasing action of the lock-up clutch 24 would not cause a shock upon the engine output reduction and the brake application.

It is also noted that the lock-up clutch releasing means 208 (step SD5) is operated to release the lock-up clutch 24 only where the releasing of the lock-up clutch 24 is necessary to prevent the generation of a shock due to rapid reduction of the engine speed caused by the reduction of the throttle opening angle $\theta_{TH}$ and the brake application. That is, the lock-up clutch releasing means 208 is operated only when the initiation of an operation of the turning stability control means 160 is detected by the turning control initiation detecting means 202 (step SD2) and when the understeering tendency of the vehicle is detected by the understeering detecting means 204 (step SD4).

Figure 19:
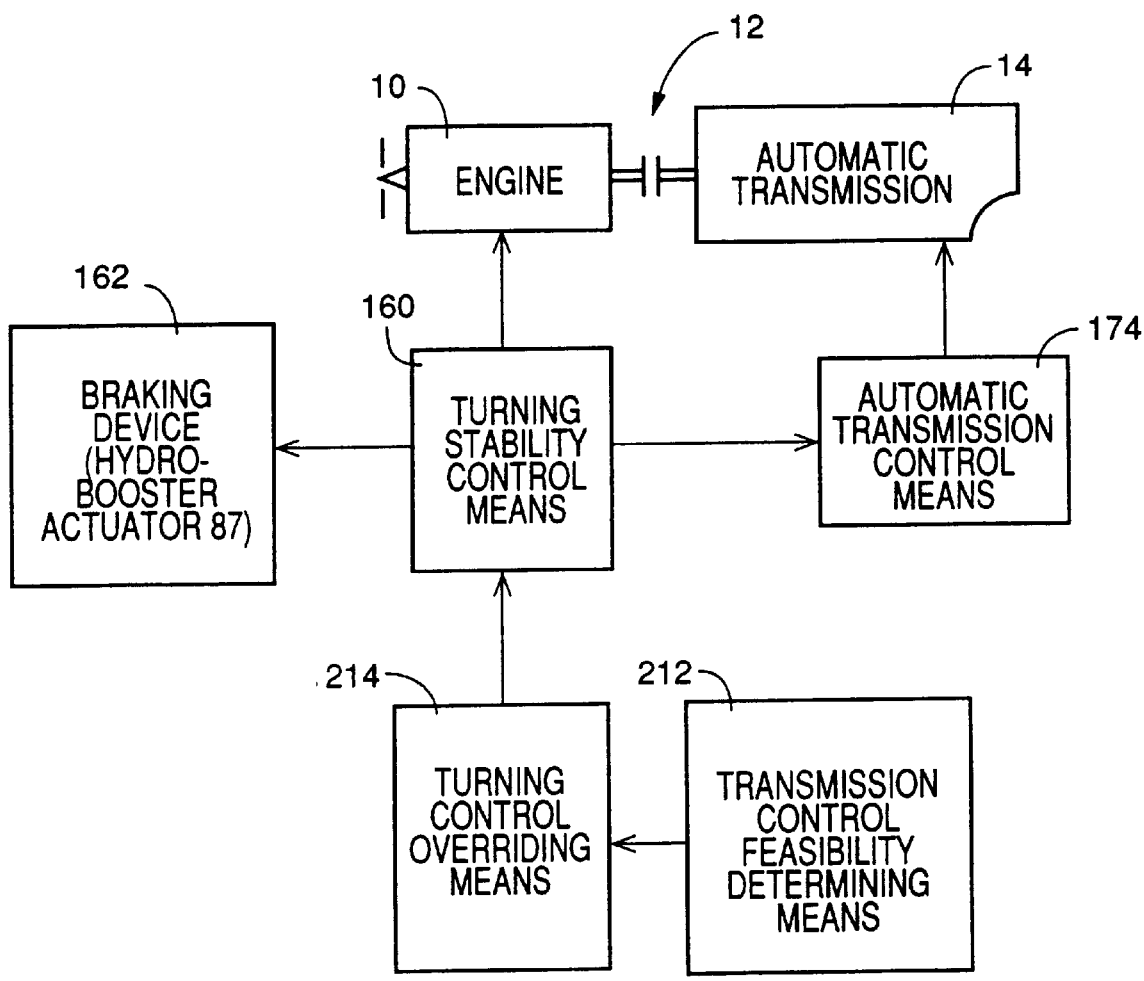
FIG. 19 is a block diagram corresponding to that of FIG. 6, illustrating various functional means of a vehicle control apparatus according to a sixth embodiment of the invention.
Figure 20:
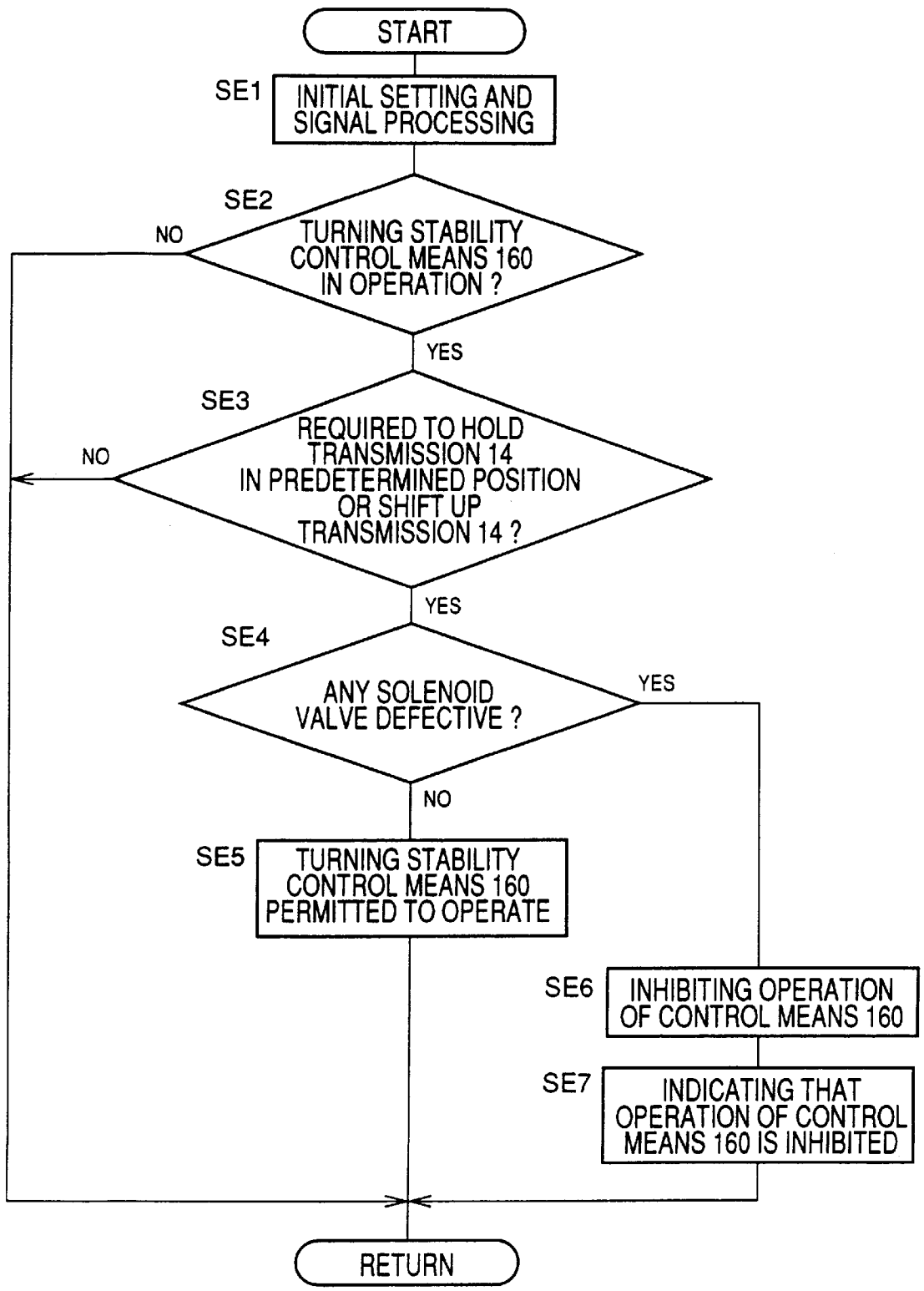
FIG. 20 is a flow chart corresponding to that of FIG. 7, illustrating a control routine executed by the apparatus of the sixth embodiment of FIG. 19.

Reference is now made to FIGS. 19 and 20 showing a vehicle control apparatus according to a sixth embodiment of this invention. This vehicle control apparatus includes transmission control feasibility determining means 212, and running control overriding means in the form of turning control overriding means 214, as shown in the block diagram of FIG. 19, in addition to the turning stability control means 160, braking device 162 and automatic transmission control means 174 which have been described above.

In the present embodiment, the turning stability control means 160 is not only adapted to reduce the engine output and effect the brake application to the vehicle, for the purpose of improving the stability of turning of the vehicle, but also adapted to hold the automatic transmission 14 in a predetermined position or effect a shift-up action of the automatic transmission 14, for the purpose of reducing the vehicle drive force. The transmission control feasibility determining means 212 is adapted to determine whether it is impossible to hold the automatic transmission 14 in the predetermined position or shift up the automatic transmission 14. This determination may be effected by determining whether any shift valves and solenoid-operated valves (e.g., shift valves 88, 90, 118) and solenoid-operated valves S1, S2) for controlling the frictional coupling devices (e.g., B2, B3) are defective. Alternatively, the transmission control feasibility determining means 212 is adapted to effect the above determination by determining whether the appropriate shifting to the predetermined position or shift-up action of the automatic transmission 14 is inhibited for some reason or other.

The turning control overriding means 214 is operated when the operation of the turning stability control means 160 is required to hold the automatic transmission 14 in the predetermined position or effect a shift-up action of the automatic transmission 14, and when the transmission control feasibility determining means 212 determines that the above operation is impossible. The turning control overriding means 214 is adapted to inhibit the operation of the turning stability control means 160, or command the turning stability control means 160 to perform another operation for reducing the vehicle drive force.

The present vehicle control apparatus is adapted to execute a control routine illustrated in the flow chart of FIG. 20. The control routine is initiated with step SE1 similar to step SA1, to effect the initial setting and signal processing. Step SE1 is followed by step SE2 to determine whether the turning stability control means 160 is in operation. If a negative decision (NO) is obtained in step SE2, one cycle of execution of the routine of FIG. 20 is terminated. If an affirmative decision (YES) is obtained in step SE2, the control flow goes to step SE3 to determine whether the turning stability control means 160 is required to be operated for holding the automatic transmission 14 in the predetermined position or shifting up the automatic transmission 14. If a negative decision (NO) is obtained, one cycle of execution of the routine is terminated.

If an affirmative decision (YES) is obtained in step SE3, the control flow goes to step SE4 corresponding to the transmission control feasibility determining means 212, to determine whether any solenoid-operated valve for holding the automatic transmission 14 in the currently established position or shifting up the automatic transmission 14 is defective. If a negative decision (NO) is obtained in step SE4, the control flow goes to step SE5 in which the turning stability control means 160 is permitted to be operated to hold the automatic transmission in the predetermined position or shift up the automatic transmission 14.

If an affirmative decision (YES) is obtained in step SE4, the control flow goes to step SE6 corresponding to the turning control overriding means 214, to inhibit the operation of the turning stability control means 160 to reduce the vehicle drive force. Step SE6 is followed by step SE7 to provide an indication that the operation of the turning stability control means 160 is inhibited.

In the present vehicle control apparatus, the throttle opening angle $\theta_{TH}$ is controlled by an amount corresponding to an expected amount of reduction of the vehicle drive force caused by the operation of the turning stability control means 160 of holding the automatic transmission 14 in the predetermined position or shifting up the automatic transmission 14. If the transmission control feasibility determining means 212 (step SE4) determines that it is impossible to hold the automatic transmission 14 in the predetermined position or effect the predetermined shift-up action of the automatic transmission 14, the turning control overriding means 214 (step SE6) inhibits the operation of the turning stability control means 160. This arrangement assures turning stability of the vehicle even in the case where the automatic transmission 14 cannot be shifted to the predetermined position or shifted up to reduce the vehicle drive force, due to some defect of any valve associated with the shifting of the automatic transmission 14, or due to inhibition of a shifting action of the automatic transmission 14 for some reason or other.

Although the turning control overriding means 214 (step SE6) is arranged to inhibit the operation of the turning stability control means 160, the overriding means 214 may be adapted to reduce the throttle opening angle $\theta_{TH}$ or other operation to reduce the vehicle drive force, rather than to hold the automatic transmission 14 in the predetermined position or shift up the automatic transmission 14.

Figure 21:
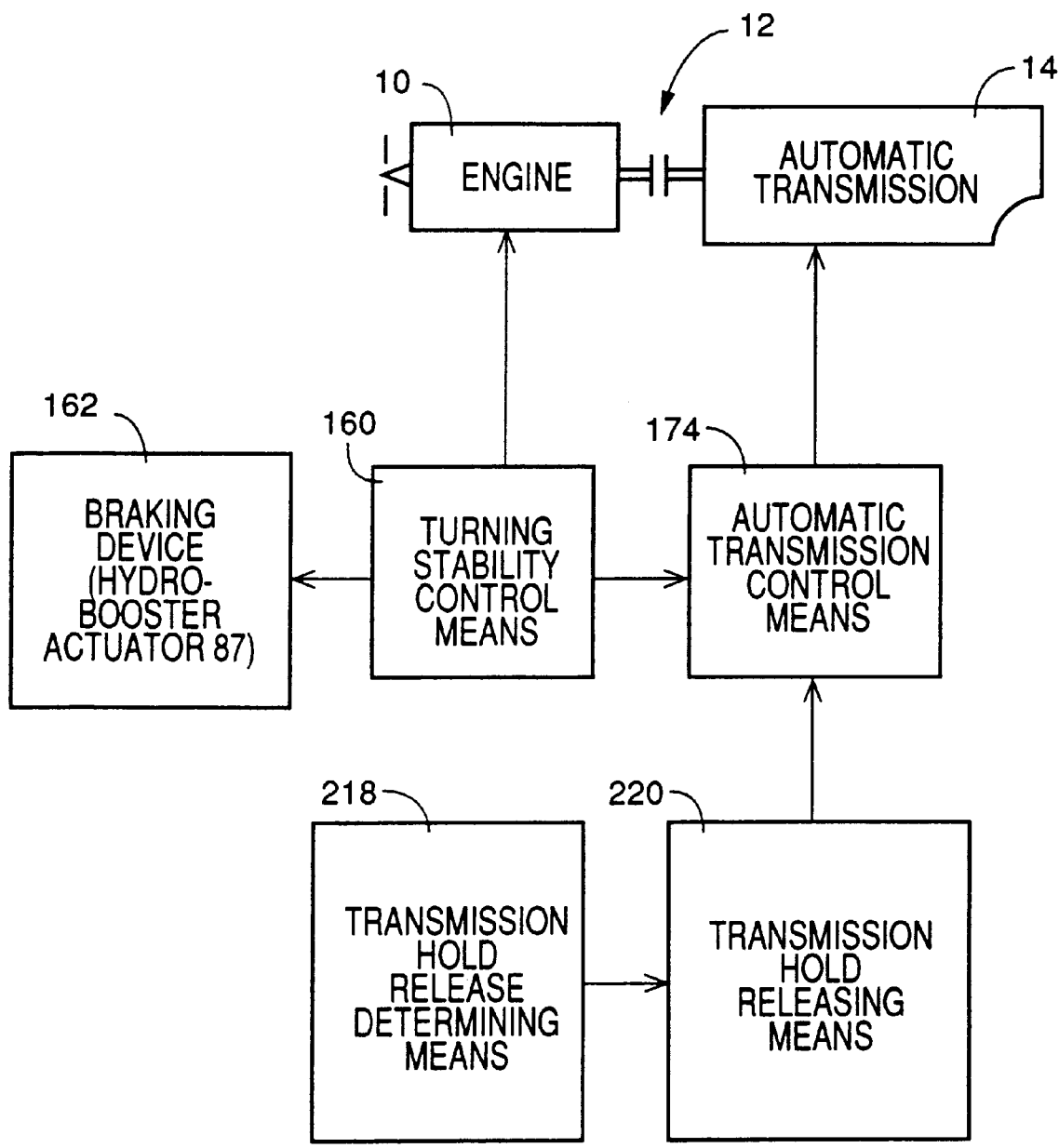
FIG. 21 is a block diagram corresponding to that of FIG. 6, illustrating various functional means of a vehicle control apparatus according to a seventh embodiment of the invention.
Figure 22:
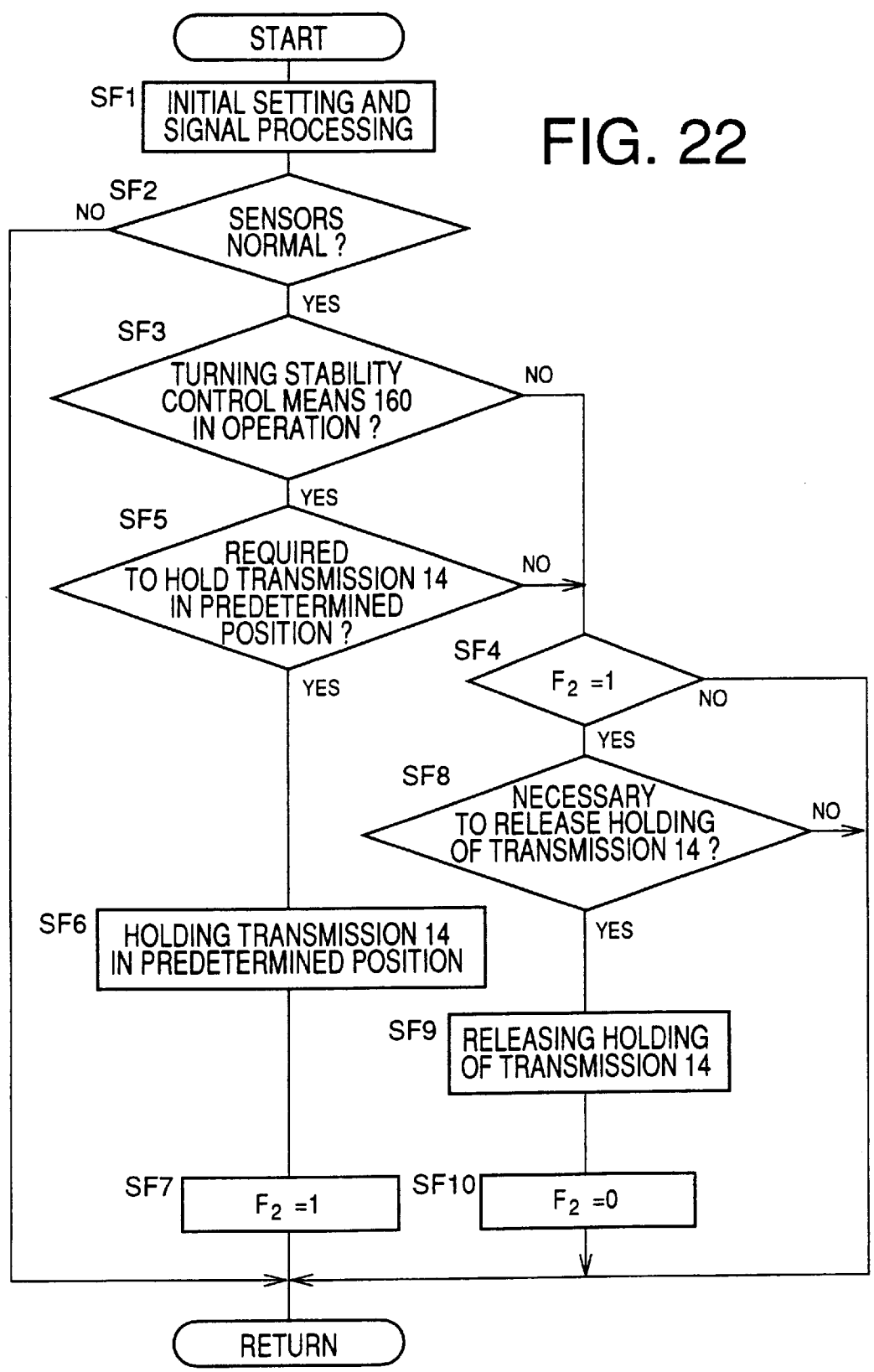
FIG. 22 is a flow chart corresponding to that of FIG. 7, illustrating a control routine executed by the apparatus of the seventh embodiment of FIG. 21.

Referring next to FIGS. 21 and 22, there will be described a vehicle control apparatus according to a seventh embodiment of this invention, which includes transmission hold release determining means 218 and transmission hold releasing means 220, in addition to the turning stability control means 160, braking device 162 and automatic transmission control means 174 which have been described above.

In the present vehicle control apparatus, the turning stability control means 160 is not only adapted to reduce the engine output and effect the brake application to the vehicle for improving the stability of turning of the vehicle, but also adapted to hold the automatic transmission 14 in a predetermined position for reducing the vehicle drive force. The transmission hold releasing determining means 218 is adapted to determine whether the vehicle is running in a predetermined condition in which the automatic transmission 14 does not suffer from a shifting shock even if the holding of the automatic transmission 14 in the predetermined position by the turning stability control means 160 is released.

For example, the transmission hold release determining means 218 is adapted to determine whether the predetermined position in which the automatic transmission 14 is held by the turning stability control means 160 is the same as the position to be selected by the automatic transmission control means 174 on the basis of the detected vehicle speed V and throttle opening angle $\theta_{TH}$ and according to the shift boundary lines indicated in FIG. 23 by way of example. If the predetermined position is the same as the selected position, the transmission hold release determining means 218 determines that the vehicle is in the predetermined running condition, that is, determines that the current vehicle running condition does not cause a shifting shock of the automatic transmission 14 even if the holding of the automatic transmission 14 in the predetermined position is released. Alternatively, the transmission hold release determining means 218 determines whether the vehicle is running in an "accelerator-off" state or in an engine braking condition in which a drive force is transmitted in the direction from the drive wheels toward the engine 10, or alternatively whether the vehicle is running in an "accelerator-on" state in which a drive force is transmitted in the direction from the engine 10 toward the drive wheels. If the vehicle is running in the "accelerator-off" state or in the engine braking condition, the transmission hold release determining means determines that a shifting shock will not be generated by releasing the holding of the automatic transmission 14 in the predetermined position, namely, the automatic transmission 14 can be shifted up from the predetermined position without a shifting shock. If the vehicle is running in the "accelerator-on" state, the transmission hold release determining means determines that the automatic transmission 14 can be shifted down from the predetermined position without a shifting shock.

The transmission hold releasing means 220 is operated when the transmission hold release determining means 218 determines that the vehicle is running in the predetermined condition in which a shifting shock will not be generated even if the holding in the predetermined position is released. The transmission hold releasing means 220 is adapted to release the holding of the automatic transmission 14 in the predetermined position, namely, permits the automatic transmission 14 to be shifted from the predetermined position. For instance, the transmission hold releasing means 220 releases the holding of the transmission 14 and permits both of a shift-up action and a shift-down action of the automatic transmission 14, if the transmission hold release determining means 218 determines that the predetermined position in which the automatic transmission 14 is held by the turning stability control means 160 to improve the turning stability of the vehicle is the same as the position which is to be selected by the automatic transmission control means 174 on the basis of the detected vehicle speed V and throttle opening angle $\theta_{TH}$ and according to the predetermined shift boundary lines. Alternatively, the transmission hold releasing means 220 releases the holding of the transmission 14 and permits a shift-up action of the automatic transmission 14, if the transmission hold release determining means 218 determines that the vehicle is running in the "accelerator-off" state or engine braking condition. Further alternatively, the transmission hold releasing means 220 releases the holding of the transmission 14 and permits the automatic transmission 14 to be shifted down within a predetermined maximum number of positions, if the transmission hold release determining means 218 determines that the vehicle is running in the "accelerator-on" state in which the drive force is transmitted from the engine 10 to the drive wheels.

The present vehicle control apparatus is adapted to execute a control routine illustrated in the flow chart of FIG. 22, when the shift lever 72 is placed in the DRIVE position "D". The routine is initiated with step SF1 similar to step SA1, to effect the initial setting and signal processing. Step SF1 is followed by step SF2 to determine whether the various sensors are normally functioning. If a negative decision (NO) is obtained in step SF2, one cycle of execution of the routine is terminated. If an affirmative decision (YES) is obtained in step SF2, the control flow goes to step SF3 to determine whether the turning stability control means 160 is in operation. If a negative decision (NO) is obtained in step SF3, the control flow goes to step SF4 to determine whether a flag F2 is set at "1". When this flag F2 is set at "1", it indicates that the automatic transmission 14 is held in a predetermined position. When the turning stability control means 160 is not in operation, a negative decision (NO) is obtained in step SF4, and one cycle of execution of the routine of FIG. 22 is terminated.

If the turning stability control means 160 is in operation, that is, if an affirmative decision (YES) is obtained in step SF3, the control flow goes to step SF5 to determine whether the automatic transmission 14 is required to be held in the predetermined position by the turning stability control means 160. When a negative decision (NO) is obtained in step SF5, the negative decision (NO) is obtained in step SF4, and one cycle of execution of the routine is terminated. In this case, the operation of the turning stability control means 160 for improving the turning stability of the vehicle is continued.

If an affirmative decision (YES) is obtained in step SF5, the control flow goes to step SF6 in which the automatic transmission 14 is held in the currently established position. Then, step SF7 is implemented to set the flag F2 to "1".

If the operation of the turning stability control means 160 is terminated after the automatic transmission 14 is held in the same position, or if the automatic transmission 14 in the same position is no longer required to be held in the same position, the negative decision (NO) is obtained in step SF3 or SF5, and the control flow goes to step SF4. In this case, the affirmative decision (YES) is obtained in step SF4, and the control flow goes to step SF8 corresponding to the transmission hold release determining means 218, to determine whether the vehicle is running in the predetermined condition in which the automatic transmission 14 can be shifted without a shifting shock, more specifically, determine whether the currently established position of the automatic transmission 14 is the same as the position to be selected by the automatic transmission control means 174 on the basis of the detected vehicle speed and throttle opening angle $\theta_{TH}$ and according to the predetermined shift boundary lines, or whether the vehicle is running in the "accelerator-off" state or engine braking condition in which the drive force is transmitted from the drive wheels toward the engine 10, or in the "accelerator-on" state in which the drive force is transmitted from the engine 10 toward the drive wheels.

If a negative decision (NO) is obtained in step SF8, one cycle of execution of the routine is terminated. If an affirmative decision (YES) is obtained in step SF8, the control flow goes to step SF9 corresponding to the transmission hold releasing means 220, to release the holding of the automatic transmission 14, and then goes to step SF10 in which the flag F2 is reset to "0". Thus, one cycle of execution of the routine is terminated with step SF10. In step SF9 in which the holding of the automatic transmission 14 is released, the automatic transmission 14 is permitted to be shifted up or down from the present position, if the position to be selected by the automatic transmission control means 174 according to the predetermined shift boundary lines of FIG. 23 is the same as the presently established position. If the vehicle is running in the accelerator-off state or engine braking condition, the automatic transmission 14 is permitted to be shifted up from the present position in step SF9. If the vehicle is running in the accelerator-on state, the automatic transmission 14 is permitted to be shifted down from the present position, for example, shifted down one position from the present position. In this case, the maximum number of shift-down positions of the automatic transmission is determined so as to prevent an unexpected feel upon subsequent further depression of the accelerator pedal by the vehicle operator.

In the present vehicle control apparatus according to the seventh embodiment of this invention, the holding of the automatic transmission 24 in the predetermined position is released by the transmission hold releasing means 220 (step SF9) when the transmission hold release determining means 218 (step SF8) determines that the vehicle is running in the predetermined condition in which a shifting action of the automatic transmission 14 from the predetermined position does not cause a shifting shock. This arrangement is effective to prevent a shifting shock of the automatic transmission 14 or a decrease of the vehicle drive force when the automatic transmission 14 is shifted up or down immediately after the holding is released or cancelled.

The transmission hold releasing means 220 (step SF8) releases the holding of the automatic transmission 14 and permits a shift-up or shift-down action of the automatic transmission 14, when the transmission hold release determining means 218 (step SF8) determines that the vehicle is running in the accelerator-off state or engine braking state, or in the accelerator-on state.

When the vehicle is running in the accelerator-on state in which the drive force is transmitted in the direction from the engine 10 toward the drive wheels, the maximum number of shift-down positions is determined so as to prevent the unexpected feel upon subsequent further depression of the accelerator pedal. The maximum number may be one.

While the control routine of FIG. 22 executed when the shift lever 72 is in the DRIVE position "D" has been described above, the routine may be suitably modified where the shift lever 72 is placed in an engine braking position such as the position "3" or "2". When the shift lever 72 is in an engine braking position, an engine brake may be applied to the vehicle even when the automatic transmission 14 has been shifted up. In this case, therefore, the transmission hold releasing means 220 or step SF9 may be adapted to permit only a shift-down action of the automatic transmission 14 when the transmission hold release determining means 218 determines that the vehicle is running in the predetermined condition. In this instance, the shift-down action may be effected by means of a synchronizer, for avoiding abrupt engine braking upon the shift-down action after the holding of the automatic transmission 14 is released.

While the presently preferred embodiments of the present invention have been described above in detail by reference to the accompanying drawings, it is to be understood that the invention is not limited to the details of the illustrated embodiments, but may be otherwise embodied.

While the automotive vehicle controlled by the illustrated embodiments of the control apparatus is equipped with the torque converter 12 having the lock-up clutch 24, the torque converter 12 may be replaced by a fluid coupling having a lock-up clutch. Further, the differential limiting clutch 49 may be provided in the transfer device 49, rather than in the center differential gear device 45.

Although the first embodiment has been described with respect to the control of the hydraulic pressure $P_{B3}$ of the brake B3 during the 2–1 shift-down action and the 2–3 shift-up action of the automatic transmission 14 in which the brake B3 is released, the concept of the first embodiment is equally applicable to the 1–2 shift-up action and the 3–2 shift-down action in which the brake B3 is engaged.

In the illustrated embodiments, the opening angle $\theta_{TH}$ of the throttle valve 56 is used as a parameter representative of the load acting on the engine 10, other parameters such as the operating amount of the accelerator pedal 50, the pressure in the intake pipe of the engine 10 and the output torque of the engine 10 may be used in place of the throttle opening angle $\theta_{TH}$.

While some of the illustrated embodiments have been described with respect to the shifting actions of the automatic transmission 14 in which the brake B3 is engaged or released, the concepts of these embodiments are applicable to the other shifting actions involving the engaging and releasing actions of the other frictional coupling devices.

The control routines illustrated in the flow charts of FIGS. 7, 9, 12, 14, 16, 20 and 22 may be suitably modified by addition of further steps or by changing the contents of the steps, without departing from the intended functions performed in those embodiments. Further, the features of these embodiments may be combined as needed.

It is to be understood that the invention may be embodied with various other changes, modifications and improvements, which may occur to those skilled in the art, in the light of the foregoing teachings.

What is claimed is:

1. An apparatus for controlling an automotive vehicle having an automatic transmission, said apparatus comprising:

automatic transmission control means for shifting said automatic transmission according to a normal shifting pattern, transmission control overriding means for overriding said automatic transmission control means while the vehicle is running in a predetermined condition;

running stability control means operated upon reduction of stability of running of the vehicle below a predetermined threshold, for performing a predetermined operation for improving the stability of running of the vehicle;

override detecting means for detecting an operation of said transmission control overriding means; and running stability control preference means, operated when the operation of said transmission control overriding means is detected by said override detecting means, for disabling said transmission control overriding means and commanding said running stability control means to be operated for improving the stability of running of the vehicle.

2. An apparatus according to claim 1, wherein said transmission control overriding means holds said automatic transmission in a currently established position thereof while the vehicle is running with a steering angle exceeding a predetermined upper limit, and/or while the vehicle is running on a road surface whose gradient is outside a predetermined range.

3. An apparatus according to claim 1, further comprising:

override stability determining means, operated upon termination of the operation of said running stability control means initiated by said running stability control preference means, for determining whether an operation of said transmission control overriding means can be resumed with stability without a shifting shock of said automatic transmission; and override enabling means for enabling said transmission control overriding means to operate for controlling said automatic transmission, when said override stability determining means determines that the operation of said transmission control overriding means can be resumed with stability.

* * * * *